(12) United States Patent
Shah

(10) Patent No.: US 11,339,701 B2
(45) Date of Patent: May 24, 2022

(54) INTEGRATED SCR CATALYST AND LNT FOR NOX ABATEMENT

(71) Applicant: BASF Corporation, Florham Park, NJ (US)

(72) Inventor: Sandip Shah, East Brunswick, NJ (US)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 16/344,642

(22) PCT Filed: Oct. 23, 2017

(86) PCT No.: PCT/IB2017/056576
§ 371 (c)(1),
(2) Date: Apr. 24, 2019

(87) PCT Pub. No.: WO2018/078513
PCT Pub. Date: May 3, 2018

(65) Prior Publication Data
US 2020/0063628 A1  Feb. 27, 2020

Related U.S. Application Data

(60) Provisional application No. 62/411,737, filed on Oct. 24, 2016.

(51) Int. Cl.
*F01N 3/00* (2006.01)
*F01N 3/20* (2006.01)
(Continued)

(52) U.S. Cl.
CPC ......... *F01N 3/2073* (2013.01); *F01N 3/0842* (2013.01); *F01N 3/106* (2013.01);
(Continued)

(58) Field of Classification Search
CPC ...... F01N 13/0093; F01N 3/021; F01N 3/035; F01N 3/08; F01N 3/0814; F01N 3/10; F01N 3/106; F01N 3/20; F01N 3/2013
(Continued)

(56) References Cited

U.S. PATENT DOCUMENTS 5,480,621 A   1/1996   Breuer et al.
5,529,759 A   6/1996   Sanada et al.
(Continued)

FOREIGN PATENT DOCUMENTS

DE   10 2013 019 025 A   11/2013
DE   10 2013 212 802 A    1/2015
(Continued)

OTHER PUBLICATIONS

Office Action from Japanese Patent Office in counterpart Japanese Patent Application 2019-542821 dated Aug. 31, 2021 (15 pages, including translation).

*Primary Examiner* — Jason D Shanske
(74) *Attorney, Agent, or Firm* — Finnegan, Henderson, Farabow, Garrett & Dunner LLP

(57) ABSTRACT

Certain catalytic articles, systems or methods provide for excellent NOx conversion and are especially suitable for low temperature NOx conversion. The articles, systems and methods are suitable for instance for the treatment of exhaust gas of diesel engines. Certain articles or systems contain an upstream SCR composition and a downstream LNT composition. The substrate(s) may advantageously be electrically heated.

15 Claims, 16 Drawing Sheets

(51) Int. Cl.
  *F01N 13/00* (2010.01)
  *F01N 3/08* (2006.01)
  *F01N 3/10* (2006.01)

(52) U.S. Cl.
  CPC ...... *F01N 13/0093* (2014.06); *F01N 2340/02* (2013.01); *F01N 2370/02* (2013.01); *F01N 2510/0682* (2013.01); *F01N 2570/14* (2013.01)

(58) Field of Classification Search
  USPC .......................................................... 60/274
  See application file for complete search history.

(56) References Cited

U.S. PATENT DOCUMENTS

| | | | |
|---|---|---|---|
| 5,553,451 A | 9/1996 | Harada | |
| 6,044,644 A | 4/2000 | Hu et al. | |
| 7,332,135 B2 * | 2/2008 | Gandhi | B01D 53/8631 422/177 |
| 8,475,752 B2 | 7/2013 | Wan | |
| 2004/0076565 A1 | 4/2004 | Gandhi et al. | |
| 2004/0159093 A1 * | 8/2004 | Pott | F02D 41/0245 60/274 |
| 2005/0028518 A1 * | 2/2005 | Li | F01N 3/0842 60/300 |
| 2006/0260296 A1 | 11/2006 | Theis | |
| 2008/0314020 A1 * | 12/2008 | Hoard | F02D 41/042 60/274 |
| 2010/0043402 A1 | 2/2010 | Perry et al. | |
| 2010/0101221 A1 | 4/2010 | Charbonnel et al. | |
| 2010/0107605 A1 * | 5/2010 | Brinkman | B01D 53/9477 60/274 |
| 2010/0242438 A1 * | 9/2010 | Mital | F01N 3/0814 60/274 |
| 2011/0047970 A1 * | 3/2011 | Yezerets | F01N 3/0842 60/274 |
| 2011/0047990 A1 * | 3/2011 | Nagaoka | F01N 13/009 60/297 |
| 2011/0173950 A1 * | 7/2011 | Wan | F01N 3/0807 60/274 |
| 2012/0076699 A1 | 3/2012 | Ishihara | |
| 2012/0159935 A1 | 6/2012 | Li et al. | |
| 2013/0111886 A1 * | 5/2013 | Gonze | F01N 3/2033 60/286 |
| 2013/0232958 A1 * | 9/2013 | Ancimer | F01N 3/10 60/301 |
| 2014/0047819 A1 | 2/2014 | Wan et al. | |
| 2015/0000255 A1 * | 1/2015 | Harmsen | F01N 13/009 60/274 |
| 2015/0013309 A1 * | 1/2015 | Upadhyay | F01N 3/208 60/274 |
| 2015/0211427 A1 * | 7/2015 | Yasui | F02D 41/0235 123/672 |
| 2015/0252706 A1 * | 9/2015 | Kosters | F01N 13/0093 60/297 |
| 2015/0315945 A1 * | 11/2015 | Bergh | F01N 3/20 60/274 |
| 2016/0136626 A1 * | 5/2016 | Phillips | B01D 53/9418 423/239.2 |
| 2016/0290262 A1 * | 10/2016 | Hohn | F02D 41/1475 |
| 2016/0346733 A1 * | 12/2016 | Gabrielsson | B01D 53/944 |
| 2017/0037799 A1 * | 2/2017 | Balenovic | F01N 3/2066 |
| 2017/0268397 A1 * | 9/2017 | Choi | F01N 3/101 |
| 2017/0274321 A1 * | 9/2017 | Zheng | B01J 29/80 |
| 2017/0335730 A1 * | 11/2017 | Keppeler | F01N 3/035 |
| 2019/0242282 A1 * | 8/2019 | Li | F01N 3/106 |

FOREIGN PATENT DOCUMENTS

| | | |
|---|---|---|
| DE | 10 2014 201 390 A | 7/2015 |
| DE | 10 2015 119 913 A | 5/2016 |
| EP | 2 290 204 A | 3/2011 |
| JP | 2009293431 A | 12/2009 |
| WO | WO 2016-141142 | 9/2016 |
| WO | WO 2016/141142 | 9/2016 |

* cited by examiner

INTEGRATED SCR CATALYST AND LNT FOR NOX ABATEMENT

CROSS-REFERENCE TO RELATED APPLICATIONS

The present application is a U.S. National Stage entry of International Patent Application PCT/IB2017/056576, filed Oct. 23, 2017, and claims priority to U.S. Provisional Patent Application No. 62/411,737, filed Oct. 24, 2016. The disclosures of each of the applications noted above are incorporated herein by reference in their entirety.

TECHNICAL FIELD OF THE INVENTION

The present invention is directed to catalytic articles and systems comprising a selective catalytic reduction (SCR) catalyst and a lean NOx trap (LNT), as well as to methods of making and using such articles and systems.

BACKGROUND OF THE INVENTION

Lean burn engines, e.g., diesel engines and lean burn gasoline engines, provide the user with excellent fuel economy, and have very low emissions of gas phase hydrocarbons (HCs) and carbon monoxide (CO) due to their operation at high air/fuel ratios under fuel lean conditions. Diesel engines, in particular, also offer significant advantages over gasoline engines in terms of their durability and their ability to generate high torque at low speed. Effective abatement of nitrogen oxides ($NO_x$) from lean burn engines is difficult to achieve because high NOx conversion rates typically require reductant-rich conditions. Conversion of the NOx component of exhaust streams to innocuous components generally requires specialized NOx abatement strategies for operation under fuel lean conditions.

One such strategy for the abatement of NOx in the exhaust stream from lean burn engines uses NOx storage reduction (NSR) catalysts, which are also known in the art as "lean NOx traps" (LNTs). NSR catalysts contain NOx sorbent materials capable of adsorbing or "trapping" oxides of nitrogen under lean conditions and platinum group metal (PGM) components to provide oxidation and reduction functions. For its reduction role, the PGM component first catalyzes the adsorption of NOx, which is then released upon introduction of a reductant or an increase in temperature above a certain threshold. This step recovers NOx storage sites but induces release of NOx species. The released NOx is then further reduced to gaseous $N_2$ in a rich environment. NOx release can also be induced by reductants in a net oxidizing environment. However, the efficient reduction of released NOx by CO requires rich conditions. A temperature surge can also trigger NOx release because metal nitrate is less stable at higher temperatures. NOx trap catalysis is a cyclic operation. Metal compounds are believed to undergo carbonate/nitrate conversion as a dominant reaction pathway during lean/rich operations.

Selective catalytic reduction (SCR) catalyst technology is also employed for the abatement of NOx from exhaust streams. This strategy has been proven effective as applied to stationary sources, e.g., treatment of flue gases. In this strategy, NOx is reduced with a reductant, e.g., $NH_3$, to nitrogen ($N_2$) over an SCR catalyst that is typically composed of base metals. This technology is capable of NOx reduction greater than 90%, and thus represents one of the best approaches for achieving aggressive NOx reduction goals. Nitrogen oxides include $N_2O$, $NO$, $N_2O_3$, $NO_2$, $N_2O_4$, $N_2O_5$, and $NO_3$.

Continuing improvement of internal combustion engines has resulted in greater combustion efficiency and lower exhaust gas temperatures. Low exhaust temperatures provide a challenge for removing pollutants during a cold start phase. In a cold start phase, it is particularly difficult to control nitrogen oxides (NOx) emissions, and it would be desirable to provide further catalysts to provide this function.

SUMMARY OF THE INVENTION

The disclosure generally provides a composite catalytic article comprising a selective catalytic reduction (SCR) catalyst composition and a lean NOx trap (LNT) catalyst composition. The disclosure relates to systems comprising such composite catalytic articles and to methods of making and using such catalytic articles. The articles, systems, and methods are suitable for treating lean exhaust gas streams of diesel or gasoline internal combustion engines. Various embodiments are listed below. It will be understood that the embodiments listed below may be combined not only as listed below, but in other suitable combinations in accordance with the scope of the invention.

The disclosure generally provides catalytic articles and systems comprising a selective catalytic reduction (SCR) catalyst composition and a lean NOx trap (LNT) composition, wherein the SCR catalyst composition is upstream of the LNT composition. Such compositions can be disposed on the same substrate or on separate substrates. Also disclosed is a method for treating an exhaust stream containing NOx, comprising passing the exhaust stream through such articles and systems. The present articles, systems and methods are in particular suitable for the treatment of exhaust generated from diesel engines, which operate at combustion conditions with air in excess of that required for stoichiometric combustion, i.e., lean.

In one aspect, the disclosure provides an exhaust gas treatment system comprising a SCR catalyst composition; and a LNT composition, wherein the LNT article is in fluid communication with and downstream of the SCR catalyst composition. The SCR catalyst composition can be disposed on a first substrate and the LNT composition is disposed on a second substrate or the SCR catalyst composition and the LNT composition can be disposed on the same substrate. Where the compositions are disposed on the same substrate, in some embodiments, the SCR catalyst composition extends an entire length of the substrate and the LNT composition overlays a portion of the SCR catalyst composition or the SCR catalyst composition overlays the LNT composition. Where the compositions are disposed on the same substrate, in some embodiments, the LNT composition extends an entire length of the substrate and the SCR catalyst composition overlays a portion of the LNT composition or the LNT composition overlays the SCR catalyst composition. Further, where the compositions are disposed on the same substrate, in some embodiments, the SCR catalyst composition and the LNT composition do not overlay each other.

In some embodiments, the exhaust gas treatment system further comprises one or more of a diesel oxidation catalyst, a soot filter, and an ammonia oxidation catalyst. In certain embodiments, the SCR catalyst composition is close-coupled, the LNT composition is downstream of the SCR catalyst composition, and the system further comprises a downstream underfloor diesel oxidation catalyst, catalyst soot filter, and second SCR catalyst. The system may, in some embodiments, further comprise an electrical heater. The electrical heater may be, for example, a 2-20 kW electrical heater, such as a 10 kW electrical heater or a 20 kW electrical heater. The system may, in some embodiments, further comprise a reductant injector in fluid communication with and upstream of the SCR catalyst composition.

The disclosed exhaust gas treatment systems, in some embodiments may be close-coupled. The systems, in some embodiments, may be under-floor. In certain embodiments, a first substrate comprising the SCR catalyst composition is close-coupled and a second substrate comprising the LNT composition is under-floor.

The compositions of the SCR catalyst composition and the LNT composition disclosed herein can vary. In some embodiments, the SCR catalyst composition comprises base metal-containing 8-ring small pore molecular sieves. For example, the SCR catalyst composition can comprise iron- and/or copper-containing 8-ring small pore molecular sieves. Such molecular sieves can be zeolites having a structure selected from the group consisting of AEI, AFT, AFX, CHA, EAB, ERI, KFI, LEV, SAS, SAT and SAV and, in particular embodiments, can have a CHA crystal structure. Molecular sieves with the CHA crystal structures can be, for example, aluminosilicate zeolites, borosilicates, gallosilicates, SAPOs, AlPOs, MeAPSOs and/or MeAPOs. Particular molecular sieves include, but are not limited to, SSZ-13, SSZ-62, natural chabazite, zeolite K-G, Linde D, Linde R, LZ-218, LZ-235, LZ-236, ZK-14, SAPO-34, SAPO-44, SAPO-47 and ZYT-6. Molecular sieves can optionally further contain an alkaline earth component.

In some embodiments, the LNT composition comprises a NOx sorbent and a platinum group metal component dispersed on a refractory metal oxide support. The LNT composition can comprise, e.g., a basic oxygenated compound of an alkaline earth element selected from magnesium, calcium, strontium, barium and mixtures thereof, a ceria component and a platinum group metal component dispersed on a refractory metal oxide support.

In another aspect, the disclosure provides a method for treating an exhaust stream containing NOx, comprising passing the exhaust stream through the exhaust gas treatment system disclosed herein. In some embodiments, the exhaust stream is ≤190° C.

In a further aspect, the disclosure provides a catalytic article comprising a substrate having a first, upstream end and a second, downstream end defining an axial length and having a zoned catalytic coating thereon, the catalytic coating comprising: an upstream zone comprising a selective catalytic reduction (SCR) catalyst composition; and a downstream zone comprising a lean NOx trap (LNT) composition. The substrate can be, e.g., a porous wall-flow filter or a flow-through monolith.

The present disclosure includes, without limitation, the following embodiments.

Embodiment 1

An exhaust gas treatment system comprising a SCR catalyst composition; and a LNT composition, wherein the LNT article is in fluid communication with and downstream of the SCR catalyst composition.

Embodiment 2

The exhaust gas treatment system of the preceding embodiment, wherein SCR catalyst composition is disposed on a first substrate and the LNT composition is disposed on a second substrate.

Embodiment 3

The exhaust gas treatment system of any preceding embodiment, wherein the SCR catalyst composition and the LNT composition are disposed on the same substrate.

Embodiment 4

The exhaust gas treatment system of any preceding embodiment, wherein the SCR catalyst composition extends an entire length of the substrate and the LNT composition overlays a portion of the SCR catalyst composition or the SCR catalyst composition overlays the LNT composition.

Embodiment 5

The exhaust gas treatment system of any preceding embodiment, wherein the LNT composition extends an entire length of the substrate and the SCR catalyst composition overlays a portion of the LNT composition or the LNT composition overlays the SCR catalyst composition.

Embodiment 6

The exhaust gas treatment system of any preceding embodiment, wherein the SCR catalyst composition and the LNT composition do not overlay each other.

Embodiment 7

The exhaust gas treatment system of any preceding embodiment, further comprising one or more of a diesel oxidation catalyst, a soot filter, and an ammonia oxidation catalyst.

Embodiment 8

The exhaust gas treatment system of any preceding embodiment, wherein the SCR catalyst composition is close-coupled, and wherein the LNT composition is downstream of the SCR catalyst composition, further comprising a downstream underfloor diesel oxidation catalyst, catalyst soot filter, and second SCR catalyst.

Embodiment 9

The exhaust gas treatment system of any preceding embodiment, further comprising an electrical heater.

Embodiment 10

The exhaust gas treatment system of any preceding embodiment, wherein the electrical heater is a 2 kW to 20 kW electrical heater.

Embodiment 11

The exhaust gas treatment system of any preceding embodiment, further comprising a reductant injector in fluid communication with and upstream of the SCR catalyst composition.

Embodiment 12

The exhaust gas treatment system of any preceding embodiment, which is close-coupled.

Embodiment 13

The exhaust gas treatment system of any preceding embodiment, which is under-floor.

Embodiment 14

The exhaust gas treatment system of any preceding embodiment, wherein a first substrate (comprising the SCR catalyst composition) is close-coupled and a second substrate (comprising the LNT composition) is under-floor.

Embodiment 15

The exhaust gas treatment system of any preceding embodiment, wherein the SCR catalyst composition comprises base metal-containing 8-ring small pore molecular sieves.

Embodiment 16

The exhaust gas treatment system of any preceding embodiment, wherein the LNT composition comprises a NOx sorbent and a platinum group metal component dispersed on a refractory metal oxide support.

Embodiment 17

A method for treating an exhaust gas stream containing NOx, comprising passing the exhaust gas stream through the exhaust gas treatment system of any preceding embodiment.

Embodiment 18

The method of the preceding embodiment, wherein the exhaust stream is ≤190° C.

Embodiment 19

A catalytic article comprising a substrate having a first, upstream end and a second, downstream end defining an axial length and having a zoned catalytic coating thereon, the catalytic coating comprising: an upstream zone comprising a selective catalytic reduction (SCR) catalyst composition; and a downstream zone comprising a lean NOx trap (LNT) composition.

Embodiment 20

The article of the preceding embodiment, wherein the substrate is a porous wall-flow filter.

Embodiment 21

The article of Embodiment 19, wherein the substrate is a flow-through monolith.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE INVENTION

Figure 1:
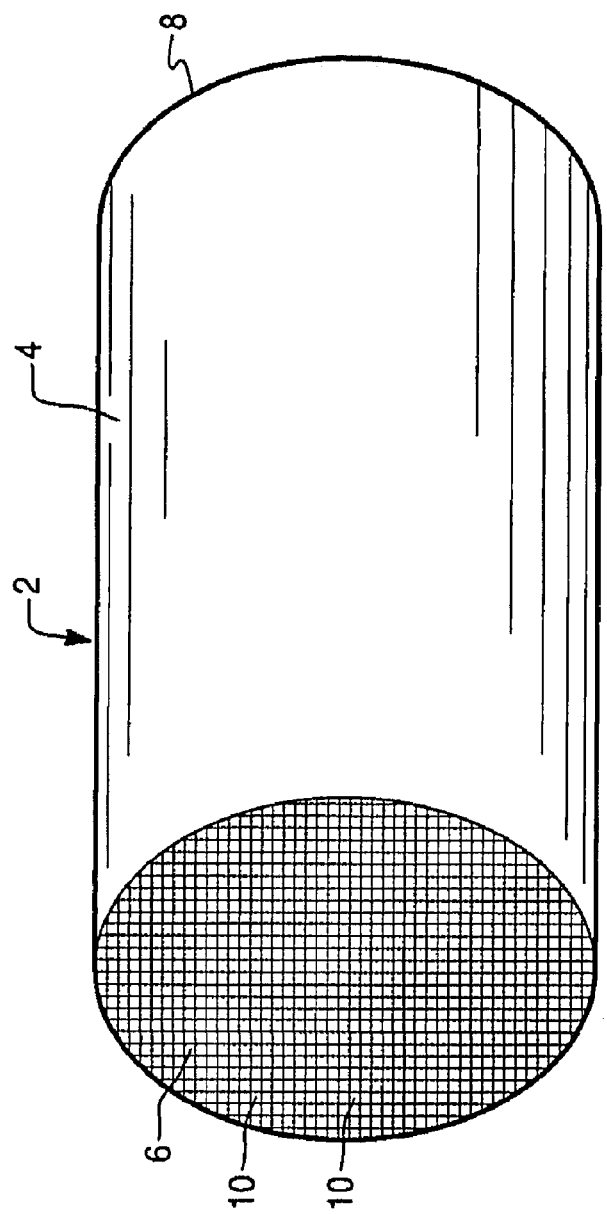
FIG. 1 is a perspective view of a honeycomb-type substrate carrier which may comprise one or more catalyst compositions, in accordance with the present invention.

The invention relates to catalytic articles, systems and methods effective for the abatement of NOx contained in exhaust gas streams of lean burn engines. Generally, the articles, systems and methods provided herein comprise an upstream SCR catalyst composition and a downstream LNT composition, and may be operated with alternating lean and rich exhaust gases.

As used herein, the term "catalyst" or "catalyst composition" refers to a material that promotes a reaction. The catalyst includes the "catalytically active species" and the "carrier" that carries or supports the active species. For example, molecular sieves including zeolites are carriers/supports for present copper and iron active catalytic species. Likewise, refractory metal oxide particles may be a carrier for platinum group metal catalytic species. The catalytically active species are also termed "promoters" as they promote chemical reactions. For instance, the present copper- or iron-containing molecular sieves may be termed copper- or iron-promoted molecular sieves. A "promoted molecular sieve" refers to a molecular sieve to which catalytically active species are intentionally added.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the term "substrate" refers to the monolithic material onto which the catalyst composition is placed.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 30%-90% by weight) of particles in a liquid vehicle, which is then coated onto a substrate and dried to provide a washcoat layer.

As used herein, the term "catalytic article" refers to an element that is used to promote a desired reaction. For example, a catalytic article may comprise a washcoat containing catalytic compositions on a substrate.

As used herein, "impregnated" or "impregnation" refers to permeation of the catalytic material into the porous structure of the support material.

The term "abatement" means a decrease in the amount, caused by any means.

Weight percent (wt. %), if not otherwise indicated, is based on an entire composition free of any volatiles, that is, based on solids content.

LNT Composition

One catalyst composition of the articles, systems, and methods disclosed herein is a lean NOx trap (LNT) composition. LNT refers to a lean NOx trap, which is typically a catalyst containing a platinum group metal (PGM) component and a NOx sorbent (e.g., an alkaline earth trap metal). LNT compositions may optionally contain other components such as oxygen storage components. LNTs are believed to operate by promoting storage of NOx during a lean period of operation ($\lambda 1.0$) and catalyzing reduction of stored NOx to $N_2$ during a rich period ($\lambda 1.0$). Some LNT catalysts release NOx above a specific temperature, wherein this temperature is dependent upon the composition of the LNT washcoat.

Certain exemplary LNT compositions are taught, for example, in U.S. Pat. No. 8,475,752 to Wan and U.S. Pat. No. 9,321,009 to Wan, et al., which are incorporated herein by reference. A suitable NOx sorbent comprises a basic oxygenated compound of an alkaline earth element selected from magnesium, calcium, strontium, barium and mixtures thereof and an oxygenated compound of a rare earth element, such as cerium (i.e., a ceria component). "Rare earth metal components" refer to one or more oxides of the lanthanum series defined in the Periodic Table of Elements, including lanthanum, cerium, praseodymium and neodymium. The rare earth metal component, e.g., ceria component, may further contain one or more of lanthanum, neodymium or praseodymium. "Platinum group metal components" (PGM) refer to platinum group metals or compounds thereof, for example or one of their oxides.

The ceria component may be dispersed on a support, e.g., a refractory metal oxide support by, for example, dispersing a soluble precursor (e.g., cerium nitrate) thereon. Alternatively, the component is provided in particulate form in the composition, such as fine particles as small as 1 to 15 microns in diameter or smaller, as opposed to being dispersed on the support. In some embodiments, the ceria component may comprise a bulk fine particulate material of co-formed rare earth metal-zirconia composite (e.g., a ceria-zirconia composite) as taught in U.S. Pat. No. 5,057,483 to Wan, which is incorporated herein by reference. Such particles can maintain a BET surface area of above 40 $m^2/g$ upon exposure to 900° C. for an extended period of time. "BET surface area" has its usual meaning of referring to the Brunauer, Emmett, Teller method for determining surface area by $N_2$ adsorption.

The support comprises at least a high surface area refractory metal oxide such as alumina, titania, zirconia; mixtures of alumina with one or more of titania, zirconia and ceria; ceria coated on alumina or titania coated on alumina. The refractory metal oxide may contain an oxide or a mixed oxide such as silica-alumina, aluminosilicates which may be amorphous or crystalline, alumina-zirconia, alumina-chromia, alumina-ceria and the like. The refractory metal oxides are in particular gamma alumina, ceria coated on alumina or titania coated on alumina. The refractory metal oxide may have a specific surface area of about 50 to about 300 $m^2/g$.

Other components may be present in the LNT compositions, such as other transition metals such as zirconium.

Suitable LNT compositions exhibit good NOx storage/NOx reduction activity at exhaust temperatures of about 100 to about 600° C., for instance from about 150 to about 450° C. In addition, in some embodiments, the LNT catalyst composition exhibits high thermal stability and the ability to remove sulfur compounds under moderate conditions.

SCR Catalyst Composition

A selective catalytic reduction (SCR) catalyst composition generally includes a base metal (e.g., copper and/or iron) ion-exchanged molecular sieves (e.g., Cu—Y and/or Fe-beta) or vanadia-based compositions, such as, for example, $V_2O_5/WO_3/TiO_2/SiO_2$). Base metal ion-exchanged zeolites are described, for example, in U.S. Pat. No. 7,998,423 to Boorse et al, which is incorporated herein by reference. For example, one exemplary type of SCR catalyst is CuCHA, e.g., copper-SSZ-13. Molecular sieves exhibiting structures similar to chabazite such as SAPO can also be employed. Thus, CuSAPO, for example copper-SAPO-34 is also suitable. Various molecular sieves that may be employed in various embodiments of the invention are outlined herein below.

Molecular sieves refer to materials having an extensive three-dimensional network of oxygen ions containing generally tetrahedral type sites and having a pore distribution of relatively uniform pore size. A zeolite is a specific example of a molecular sieve, further including silicon and aluminum. Reference to a "non-zeolite-support" or "non-zeolitic support" in a catalyst layer refers to a material that is not a zeolite and that receives precious metals, stabilizers, promoters, binders and the like through association, dispersion, impregnation or other suitable methods. Examples of such non-zeolitic supports include, but are not limited to, high surface area refractory metal oxides. High surface area refractory metal oxide supports can comprise an activated compound selected from the group consisting of alumina, zirconia, silica, titania, ceria, lanthana, baria and combinations thereof.

Certain molecular sieves, for instance, have 8-ring pore openings and double-six ring secondary building units, for example, those having the following structure types: AEI, AFT, AFX, CHA, EAB, ERI, KFI, LEV, SAS, SAT or SAV. Included are any and all isotopic framework materials such as SAPO, AlPO and MeAPO materials having the same structure type. Aluminosilicate zeolite structures do not include phosphorus or other metals isomorphically substituted in the framework. That is, "aluminosilicate zeolite" excludes aluminophosphate materials such as SAPO, AlPO and MeAPO materials, while the broader term "zeolite" includes aluminosilicates and aluminophosphates.

The 8-ring small pore molecular sieves include aluminosilicates, borosilicates, gallosilicates, MeAPSOs and MeAPOs. These include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44 and CuSAPO-47. In specific embodiments, the 8-ring small pore molecular sieve will have an aluminosilicate composition, such as SSZ-13 and SSZ-62.

In one or more embodiments, the 8-ring small pore molecular sieve has the CHA crystal structure and is selected from the group consisting of an aluminosilicate zeolite having the CHA crystal structure, SAPO, AlPO, and MeAPO. In particular embodiments, the 8-ring small pore molecular sieve having the CHA crystal structure is an aluminosilicate zeolite having the CHA crystal structure. In a specific embodiment, the 8-ring small pore molecular sieve having the CHA crystal structure has an aluminosilicate composition, such as SSZ-13 or SSZ-62. Copper- and iron-containing chabazites are termed CuCHA and FeCHA, respectively.

Molecular sieves can be zeolitic (zeolites) or may be non-zeolitic. Both zeolitic and non-zeolitic molecular sieves can have the chabazite crystal structure, which is also referred to as the CHA structure by the International Zeolite Association. Zeolitic chabazite include a naturally occurring tectosilicate mineral of a zeolite group with approximate formula $(Ca,Na_2,K_2,Mg)Al_2Si_4O_{12}\cdot 6H_2O$ (i.e., hydrated calcium aluminum silicate). Zeolitic chabazite can also be synthetically prepared.

Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et. Al.; Zeolite D, described in British Patent No. 868,846 (1961); and Zeolite R, described in U.S. Pat. No. 3,030,181 to Milton, which are hereby incorporated by reference. Synthesis of another synthetic form of zeolitic chabazite, SSZ-13, is described in U.S. Pat. No. 4,544,538 to Zones. Synthesis of a synthetic form of a non-zeolitic molecular sieve having the chabazite crystal structure, silicoaluminophosphate 34 (SAPO-34), is described in U.S. Pat. No. 4,440,871 to Lok et al. and U.S. Pat. No. 7,264,789 to Van Den et al., which are incorporated herein by reference. A method of making yet another synthetic non-zeolitic molecular sieve having chabazite structure, SAPO-44, is described for instance in U.S. Pat. No. 6,162,415 to Liu et al., which is incorporated herein by reference.

A synthetic 8-ring small pore molecular sieve (for example having the CHA structure) may be prepared via mixing a source of silica, a source of alumina and a structure directing agent under alkaline aqueous conditions. Typical silica sources include various types of fumed silica, precipitated silica and colloidal silica, as well as silicon alkoxides. Typical alumina sources include boehmites, pseudo-boehmites, aluminum hydroxides, aluminum salts such as aluminum sulfite or sodium aluminate and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 100° C. to about 200° C., for instance from about 135° C. to about 170° C. Typical reaction times are between 1 hr and 30 days and in specific embodiments, for instance from 10 hours to 3 days. At the conclusion of the reaction, optionally the pH is adjusted to between 6 and 10, for example between 7 and 7.5 and the product is filtered and washed with water. Any acid can be used for pH adjustment, for instance nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C. Molecular sieves having a CHA structure may be prepared, for instance, according to methods disclosed in U.S. Pat. No. 4,544,538 to Zones and U.S. Pat. No. 6,709,644 to Zones et al., which are incorporated herein by reference.

The molecular sieves may have a silica to alumina ratio (SAR) of from about 1, about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000. For instance, present molecular sieves may have a SAR of from about 5 to about 250, from about 10 to about 200, from about 2 to about 300, from about 5 to about 250, from about 10 to about 200, from about 10 to about 100, from about 10 to about 75, from about 10 to about 60, from about 10 to about 50, from about 15 to about 100, from about 15 to about 75, from about 15 to about 60, from about 15 to about 50, from about 20 to about 100, from about 20 to about 75, from about 20 to about 60 or from about 20 to about 50.

The present molecular sieves are, in some embodiments, copper- or iron-containing. The copper or iron resides in the ion-exchange sites (pores) of the molecular sieves and may also be associated with the molecular sieves but not "in" the pores. For example, upon calcination, non-exchanged copper salt decomposes to CuO, also referred to herein as "free copper" or "soluble copper." Free base metal may be advantageous as disclosed in U.S. Pat. No. 8,404,203 to Bull et al., which is incorporated herein by reference. The amount of free base metal such as copper may be less than, equal to or greater than the amount of ion-exchanged base metal.

The amount of iron in an iron-containing molecular sieve according to the present disclosure is, for example, from about 1.0 to about 15 wt. %, based on the total weight of the iron-containing molecular sieve and the amount of copper in the copper-containing molecular sieve is for example from about 0.3 to about 10.0 wt. %, based on the total weight of the copper-containing molecular sieve. For example, the amount of iron in the iron-containing molecular sieve in some embodiments is about 3.0, about 3.5, about 4.0, about 4.5, about 5.0, about 5.5, about 6.0, about 6.5, about 7.0, about 7.5, about 8.0, about 8.5, about 9.0, about 9.5 or about 10 wt. %, based on the total weight of the molecular sieve. The amount of copper in the copper-containing molecular sieve in some embodiments is about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0 wt. %, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9 or about 5.0 wt %, based on the total weight of the copper-containing molecular sieve.

Amounts of catalytic metals like copper or iron in a molecular sieve are reported as the oxide, CuO or $Fe_2O_3$. The total dry weight of the molecular sieve includes the any added/exchanged metals like copper or iron. The 8-ring small pore molecular sieves containing copper or iron may each have a sodium content (reported as $Na_2O$ on a volatile free basis) of below 2 wt. %, based on the total weight of the calcined molecular sieve. In more specific embodiments, sodium content is below 1 wt. % or below 2500 ppm. The molecular sieves may each have an atomic sodium to aluminum ratio of from about 0.02 to about 0.7. The molecular sieves may each have an atomic copper or iron to sodium ratio of from about 0.5 to about 50.

Molecular sieves may, in some embodiments, contain other catalytically active metals such as copper, iron, manganese, cobalt, nickel, cerium, platinum, palladium, rhodium or combinations thereof. In some embodiments, molecular sieves may contain a first metal (e.g., copper or iron) and second metal. The second metal can vary and, in some embodiments, may be iron or an alkaline earth or alkali metal. Suitable alkaline earth or alkali metals include, but are not limited to, barium, magnesium, beryllium, calcium, strontium, lithium, potassium, rubidium, cesium and combinations thereof. The optional alkaline earth or alkali metal(s) can be exchanged before, after or co-exchanged with base metal ions. Further, at least a portion of a catalytically active metal may be included during a molecular sieve synthetic process such that a tailored colloid contains a structure directing agent, a silica source, an alumina source and a metal ion (e.g. copper) source. Alkali or alkaline earth metals may optionally be incorporated into a copper-containing molecular sieve to provide additional SCR promotion.

The molecular sieves disclosed herein (including copper- or iron-containing molecular sieves) may exhibit a BET surface area, determined according to DIN 66131, of at least about 400 $m^2/g$, at least about 550 $m^2/g$ or at least about 650 $m^2/g$, for example from about 400 to about 750 $m^2/g$ or from about 500 to about 750 $m^2/g$. The molecular sieves may have a mean crystal size of from about 10 nanometers to about 10 microns, from about 50 nanometers to about 5 microns or from about 0.1 microns to about 0.5 microns as determined via SEM. For instance, the molecular sieve crystallites may have a crystal size greater than 0.1 microns or 1 micron and less than 5 microns.

Suitable SCR compositions are also disclosed for example in U.S. Pat. Nos. 9,017,626, 9,242,238 and 9,352,307, which are incorporated herein by reference. For example, further SCR compositions comprise a vanadia/titania catalyst and a Cu-zeolite or comprising a mixture of a Cu-containing molecular sieve and a Fe-containing molecular sieve.

Catalyst Article

The present disclosure provides one or more catalyst articles, each catalyst article comprising a substrate having one or more catalyst compositions disposed thereon (namely, a LNT composition and/or an SCR catalyst composition). The presently disclosed coatings may be on the wall surface and/or in the pores of the walls, that is "in" and/or "on" the filter walls. Thus, the phrase "having a catalytic coating thereon" means on any surface, for example on a wall surface and/or on a pore surface.

In some embodiments, the LNT and SCR catalyst compositions disclosed herein are provided on separate substrates. In some embodiments, the first substrate (on which the LNT composition is disposed) is a porous wall-flow filter and the second substrate (on which the SCR catalyst composition is disposed) is a flow-through monolith or alternatively, the first substrate is a flow-through monolith and the second substrate is a porous wall-flow filter. Alternatively, both substrates may be identical and may be flow-through or wall-flow substrates.

In certain preferred embodiments, the LNT composition and SCR catalyst composition are present on the same substrate. The entire coating on a substrate can comprise individual "coating layers," such that, e.g., LNT and SCR catalyst compositions together may be referred to as a catalytic coating (the entire catalytic coating) on a substrate. The entire coating is, in certain embodiments, "laterally zoned" or "zoned" along the length of the substrate, wherein each lateral zone contains one or more coating layers, as will be more fully described herein below.

According to one or more embodiments, the substrate of the catalytic article may be constructed of any material typically used for preparing automotive catalysts and typically comprises a metal or ceramic monolithic honeycomb structure, such as a wall-flow substrate. The substrate (e.g., a wall-flow filter or flow through substrate) typically provides a plurality of wall surfaces upon which washcoats comprising the catalyst compositions described herein are applied and adhered, thereby acting as a carrier for the catalyst compositions.

Exemplary metallic substrates include heat resistant metals and metal alloys, such as titanium and stainless steel as well as other alloys in which iron is a substantial or major component. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel. The alloys may also contain small or trace amounts of one or more other metals, such as manganese, copper, vanadium, titanium and the like. The surface of the wall-flow metal substrate may be oxidized at high temperatures, e.g., 1000° C. and higher, to form an oxide layer on the surface of the substrate, improving the corrosion resistance of the alloy and facilitating adhesion of the washcoat layer to the metal surface. Metallic substrates may be employed in various shapes such as pellets, corrugated sheet or monolithic foam.

Ceramic materials used to construct the disclosed substrate may include any suitable refractory material, e.g., cordierite, mullite, cordierite-α alumina, aluminum titanate, silicon carbide, silicon nitride, zircon mullite, spodumene, alumina-silica magnesia, zircon silicate, sillimanite, magnesium silicates, zircon, petalite, α alumina, aluminosilicates and the like. In alternative embodiments, one or more catalyst compositions may be deposited on an open cell foam substrate. Such substrates are well known in the art, and are typically formed of refractory ceramic or metallic materials.

Figure 2:
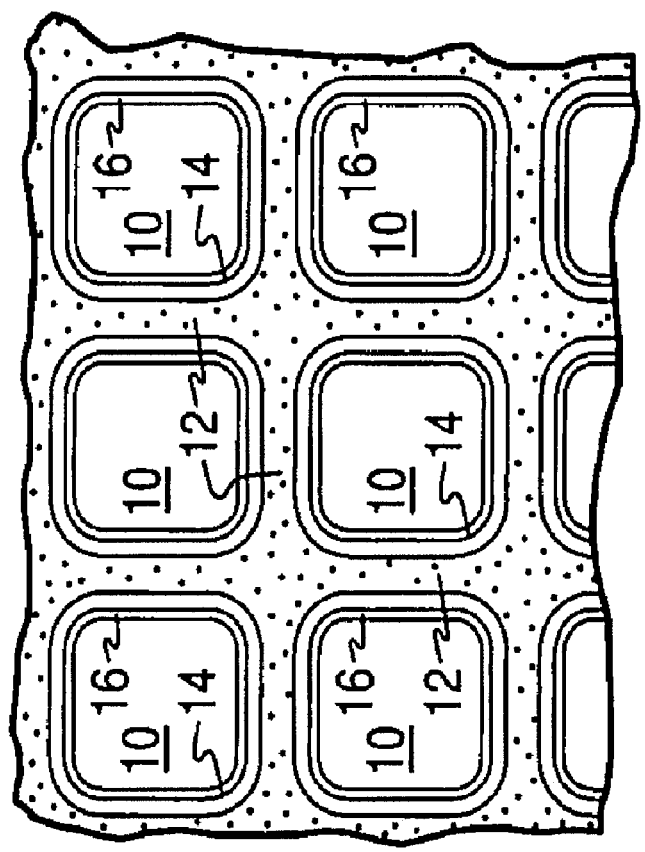
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1, in an embodiment wherein the substrate is a monolithic flow-through substrate.

FIGS. 1 and 2 illustrate an exemplary substrate 2 in the form of a flow-through substrate coated with one or more washcoat compositions as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Flow-through monolith substrates for example have a volume of from about 50 $in^3$ to about 1200 $in^3$, a cell density of from about 60 cells per square inch (cpsi) to about 500 cpsi or up to about 900 cpsi, for example from about 200 to about 400 cpsi and a wall thickness of from about 50 to about 200 microns or about 400 microns. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross-section.

Figure 3:
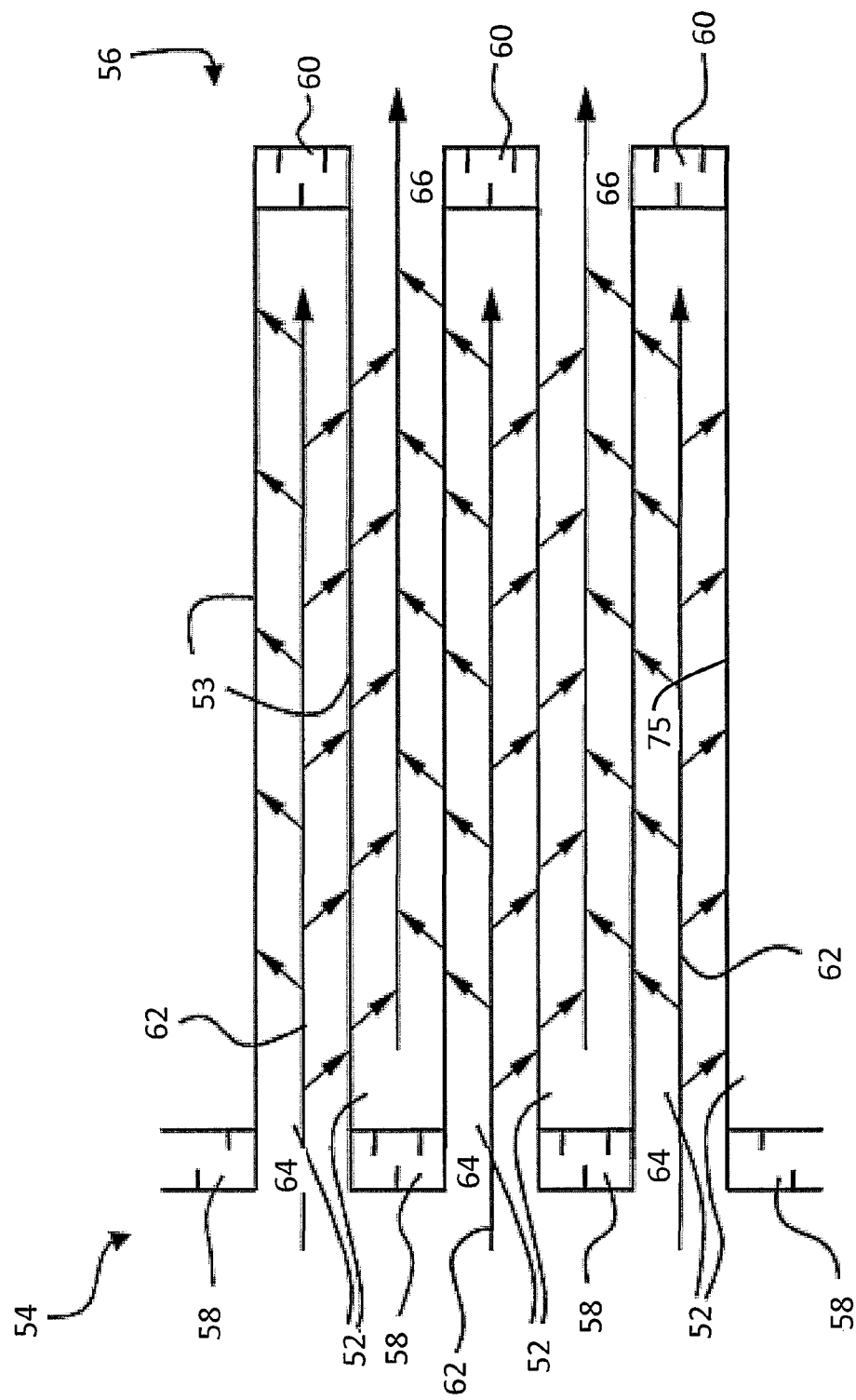
FIG. 3 is a cutaway view of a section enlarged relative to FIG. 1, wherein the honeycomb-type substrate carrier in FIG. 1 is a monolithic wall flow filter substrate.

Alternatively, FIGS. 1 and 3 illustrate an exemplary substrate 2 in the form a wall flow filter substrate coated with a washcoat composition as described herein. As seen in FIG. 1, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. Such monolithic carriers may contain up to about 700 or more flow passages (or "cells") per square inch of cross-section, although far fewer may be used. For example, a typical carrier usually has from about 100 to about 400 or about 200 to about 300 cells per square inch ("cpsi"). The cells can have cross-sections that are rectangular, square, circular, oval, triangular, hexagonal, or are of other polygonal shapes. Wall-flow substrates typically have a wall thickness from about 50 microns to about 2000 microns, for example from about 50 microns to about 400 microns or about 0.002 to about 0.1 inch. Wall-flow filters will generally have a wall porosity of at least 50% with an average pore size of at least 5 microns prior to disposition of the catalytic coating.

For instance, wall-flow filters will have a wall porosity of from about 50 to about 75% and an average pore size of from about 10 to about 30 microns prior to disposition of a catalytic coating. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. Note that in wall-flow substrates, the catalyst composition can permeate into the pore structure of the porous walls (i.e., partially or fully occluding the pore openings) in addition to being disposed on the surface of the walls in a wall-flow substrate. This invention includes the use of one or more layers of catalytic material on the inlet and/or outlet walls of the element. Catalyzed wall-flow filters are disclosed for instance in U.S. Pat. No. 7,229,597, which teaches a method of applying a catalytic coating such that the coating permeates the porous walls, that is, is dispersed throughout the walls. Flow-through and wall-flow substrates are also taught, for example, in Int. Pat. App. Pub. No. WO2016/070090 to Mohanan et al., which is incorporated herein by reference. If a wall-flow substrate is utilized, the resulting system will be able to remove particulate matter along with gaseous pollutants. Loading of the catalytic coating on a wall-flow substrate will depend on substrate properties such as porosity and wall thickness and typically will be lower than the catalyst loading on a flow-through substrate.

With respect to the LNT composition, this composition is generally in the form of a coating comprising one or more coating layers ("LNT coating composition") and is disposed at least on a downstream portion of the substrate. For instance, in some embodiments, the LNT coating composition is a bi-layer catalyst coating with a bottom layer adhered to the substrate and the top layer overlying and in contact with a portion of or the entire bottom layer. In some embodiments, the top layer comprises at least one supported PGM component and ceria. In some embodiments, the top layer comprises at least one supported PGM component and, optionally, zirconia.

The top layer may, in some embodiments, advantageously be substantially free/devoid of any alkali metal or alkaline earth metal components. "Substantially free" means for instance "little or no", for instance, means "no intentionally added" and having only trace and/or inadvertent amounts. For instance, it means less than 2 wt. % (weight %), less than 1.5 wt. %, less than 1.0 wt. %, less than 0.5 wt. %, 0.25 wt. % or less than 0.01 wt. %, based on the weight of the indicated total composition. "Substantially all" means for example at least 90% at least 91%, at least 92%, at least 93%, at least 94%, at least 95%, at least 96%, at least 97%, at least 98%, at least 99% or at least 99.5%, by weight or by number. "Substantially no" means for example less than 7%, less than 6%, less than 5%, less than 4%, less than 3%, less than 2%, less than 1%, less than 0.5%, less than 0.2% or less than 0.1%, by weight or by number.

In some embodiments, the bottom layer comprises at least one NOx adsorbent, which can, in some embodiments, be in intimate contact with at least one supported PGM component. For instance, as one particular example, the LNT coating composition may comprise an undercoat containing alumina containing ceria and BaO, ceria, MgO and $ZrO_2$, which can, in some embodiments, further contain Pt and Pd and a topcoat containing Pt and Pd supported on alumina and Rh supported on ceria with substantially no alkaline earth component in the topcoat.

With respect to the SCR catalyst composition, this composition is generally in the form of a catalytic coating comprising one or more coating layers ("SCR catalyst coating composition") and is disposed at least on the upstream portion of a substrate.

As noted, in preferred embodiments, the LNT and SCR catalyst coating compositions are present on the same substrate, in a zoned (e.g., laterally zoned) configuration. The present zoned substrates comprise an upstream SCR zone and a downstream LNT zone (SCR/LNT). The inlet end of a substrate is synonymous with the "upstream" end or "front" end. The outlet end is synonymous with the "downstream" end or "rear" end. A substrate will have a length and a width. An upstream zone is upstream of a downstream zone. A zone of a catalyzed substrate is defined as a cross-section having a certain coating structure thereon.

Figure 4A:
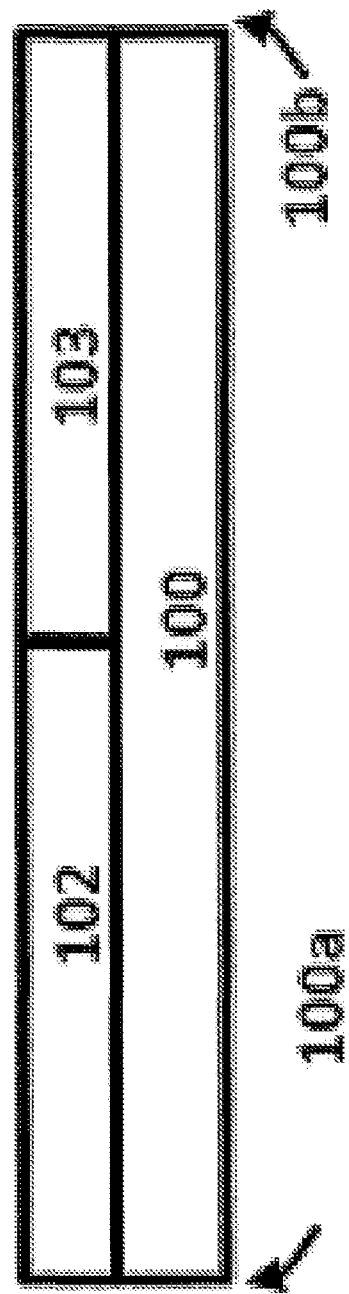
FIG. 4A shows a cross-sectional view of a zoned catalyst article of the present disclosure.
Figure 4B:
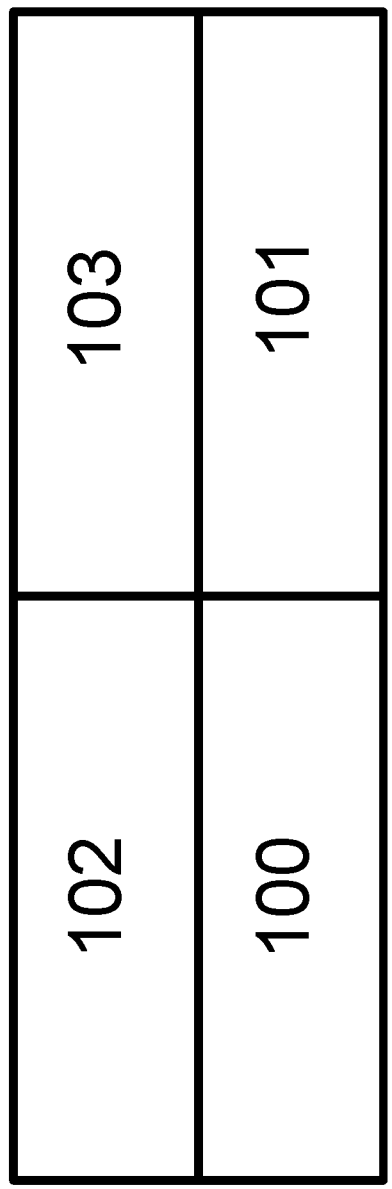
FIG. 4B shows a cross-sectional view of a zoned catalyst article of the present disclosure.
Figure 4C:
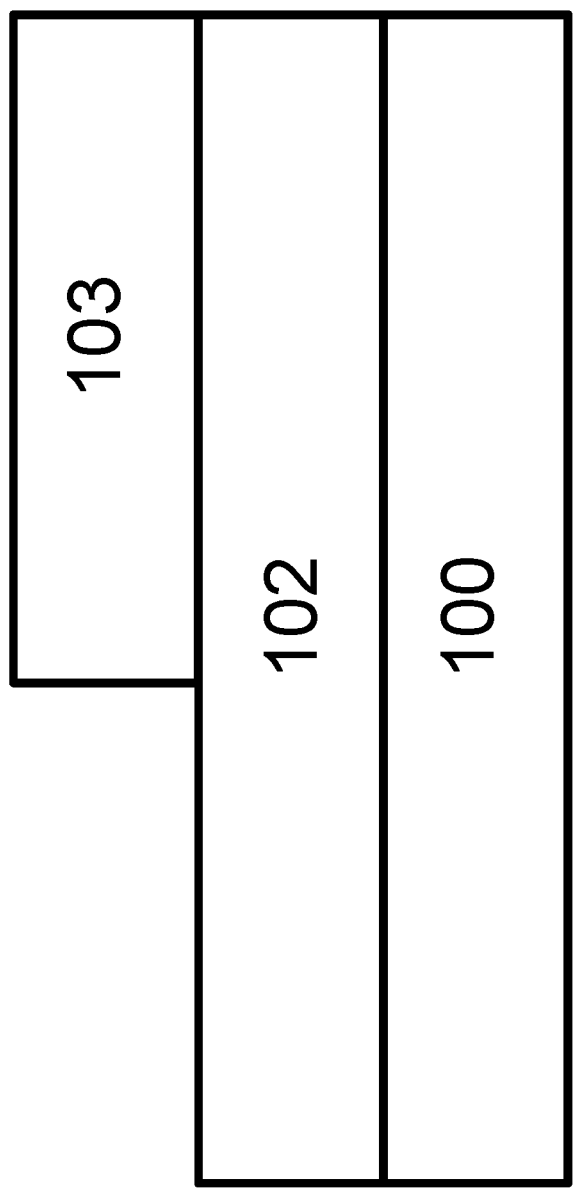
FIG. 4C shows a cross-sectional view of a zoned catalyst article of the present disclosure.
Figure 4D:
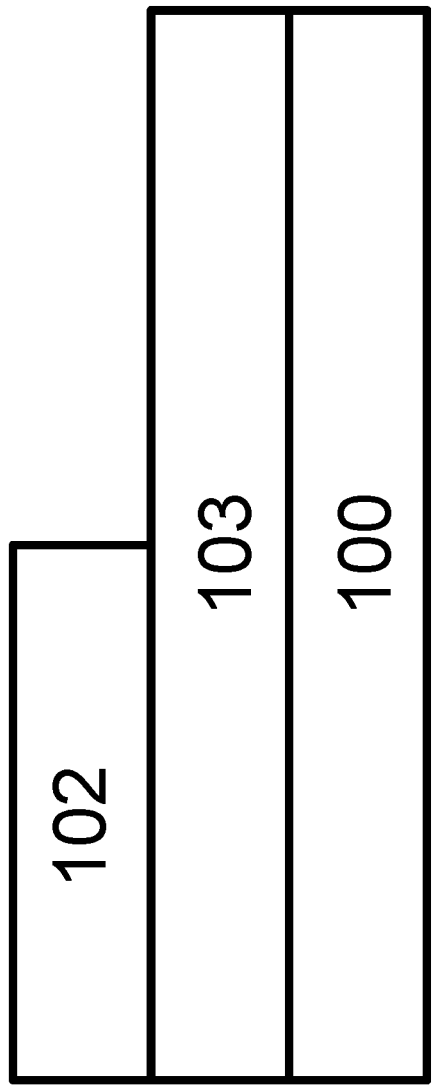
FIG. 4D shows a cross-sectional view of a zoned catalyst article of the present disclosure.

For example, the same substrate can be coated with one or more washcoat slurries of LNT coating layers (which can be the same or different) and one or more washcoat slurries of SCR catalyst coating layers (which can be the same or different). This may be more easily understood by reference to FIGS. 4A, 4B, 4C, and 4D. FIG. 4A shows an embodiment in which the first washcoat zone 102 and the second washcoat zone 103 are located side by side along the length of the substrate 100. FIG. 4B shows an embodiment in which the first washcoat zone 102 is disposed on the length of the substrate 100 and the second washcoat zone 103 is disposed on the length of a second substrate 101. FIG. 4C shows an embodiment in which the first washcoat zone 102 is disposed on the length of the substrate 100 and the second washcoat zone 103 is disposed on a portion of the length of the first washcoat 102. FIG. 4D shows an embodiment in which the second washcoat zone 103 is disposed on the length of the substrate 100 and the first washcoat zone 102 is disposed on a portion of the length of the second washcoat 103. The first washcoat zone 102 of specific embodiments (comprising the SCR catalyst coating) extends from the front or inlet end 100a of the substrate 100 through the range of about 5% to about 95%, from about 5% to about 75%, from about 5% to about 50%, or from about 10% to about 35% of the length of the substrate 100 (e.g., from the inlet end towards the outlet end extending about 10%, about 20%, about 30%, about 40%, about 50%, about 60%, about 70%, about 80% or about 90% of the substrate length). The second washcoat zone 103 (comprising the LNT coating) extends from the rear or outlet end 100b of the substrate 100 from about 5% to about 95%, from about 5% to about 75%, from about 5% to about 50%, or from about 10% to about 35% of the total axial length of the substrate 100 (e.g., from the outlet end towards the inlet end extending about 10%, about 20%, about 30%, about 40%, about 50%, about 60%, about 70%, about 80% or about 90% of the substrate length).

The SCR catalyst and LNT zones may be adjacent to each other and not overlay each other. Alternatively, the SCR catalyst and LNT zones may overlay each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

The SCR catalyst and LNT zones may be in direct contact with each other without a "middle" overlapping zone. Alternatively, the SCR catalyst and LNT zones may not be in direct contact, with a "gap" between the two zones. In the case of an "undercoat" or "overcoat," the gap between the SCR and LNT zones is termed an "interlayer." The SCR catalyst zone may extend the entire length of the substrate and the LNT zone may overlay or underlay a portion of the SCR catalyst zone. For example, the LNT zone may extend from the outlet end towards the inlet end about 10%, about 20%, about 30%, about 40%, about 50%, about 60%, about 70% or about 80% of the substrate length. The LNT zone may extend the entire length of the substrate and the SCR catalyst zone may overlay or underlay a portion of the LNT zone. For example, the SCR catalyst zone may extend from the inlet end towards the outlet end about 10%, about 20%, about 30%, about 40%, about 50%, about 60%, about 70% or about 80% of the substrate length.

The present zones are defined by the relationship of the SCR catalyst and LNT catalytic coatings. With respect to SCR and LNT catalytic coatings, there are only an upstream and a downstream zone or there may be an upstream zone, a middle zone and a downstream zone. Where the SCR catalyst and LNT catalytic coatings are adjacent and do not overlap, there are only upstream and downstream zones. Where the SCR catalyst and LNT coatings overlap to a certain degree, there are upstream, downstream and middle zones. Where for example, a SCR zone extends the entire length of the substrate and the LNT zone extends from the outlet end a certain length and overlays or underlays a portion of the SCR zone, there are only upstream and downstream zones. When adjacent and not overlapping, the zones may be in contact or there may be a gap between the zones.

The SCR and LNT zones may be in direct contact with the substrate. Alternatively, one or more "undercoats" may be present, so that at least a portion of the SCR and LNT zones are not in direct contact with the substrate (but rather with the undercoat). One or more "overcoats" may also be present, so that at least a portion of the SCR catalyst and LNT zones are not directly exposed to a gaseous stream or atmosphere (but rather are in contact with the overcoat). The interlayer(s), undercoat(s) and overcoat(s) may contain one or more catalysts or may be free of catalysts. The present catalytic coatings may comprise more than one identical layers. The simplest articles of the present invention comprise a flow-through substrate or a wall-flow filter substrate having a SCR catalyst coating composition extending from the inlet end of the filter towards the outlet end and a LNT coating composition extending from the outlet end of the filter towards the inlet end.

In describing the quantity of washcoat or catalytic metal components or other components of the composition, it is convenient to use units of weight of component per unit volume of catalyst substrate. Therefore, the units, grams per cubic inch ("$g/in^3$") and grams per cubic foot ("$g/ft^3$") are used herein to mean the weight of a component per volume of the substrate, including the volume of void spaces of the substrate. Other units of weight per volume such as g/L are also sometimes used. Concentration of a catalyst composition, or any other component, on a substrate refers to concentration per any one three dimensional section or zone, for instance any cross-section of a substrate or of the entire substrate.

With respect to the LNT composition, the PGM components (understood to promote oxidation and reduction of nitrogen species) can be in a loading in the range of about 10 $g/ft^3$ to about 250 $g/ft^3$, for example from about 20 $g/ft^3$, about 30 $g/ft^3$, about 40 $g/ft^3$, about 50 $g/ft^3$ or about 60 $g/ft^3$ to about 100 $g/ft^3$, about 150 $g/ft^3$ or about 200 $g/ft^3$, based on the substrate. If more than one coating layer is present, a platinum group metal component in different layers may be identical or different. Likewise, the amounts of platinum group metal components in different layers may be identical or different. The support is generally present, for instance, in a concentration of from about 1.5 to about 6.0 or about 7.0 $g/in^3$, based on the substrate. If more than one coating layer is present, a support in different layers may be identical or different. Likewise, the amounts of support in different layers may be identical or different. The NOx sorbent component is present, for instance, in a concentration of from about 0.1 to about 4.0 $g/in^3$, for example from about 0.2 $g/m^3$, about 0.3 $g/in^3$, about 0.4 $g/in^3$, about 0.5 $g/in^3$, about 0.6 $g/in^3$, about 0.7 $g/in^3$ or about 0.8 $g/in^3$ to about 1.0 $g/in^3$, about 1.5 $g/in^3$, about 2.0 $g/in^3$, about 2.5 $g/in^3$, about 3.0 $g/in^3$ or about 3.5 $g/in^3$, based on the substrate. The optional transition metal component(s) that can be incorporated within the LNT composition may be present in a concentration of from about 0.01 to about 0.5 $g/in^3$, based on the substrate.

With respect to the SCR catalyst composition, the composition is generally present at a concentration of for instance from about 0.3 to 4.5 $g/in^3$, or from about 0.4, about 0.5, about 0.6, about 0.7, about 0.8, about 0.9 or about 1.0 $g/in^3$ to about 1.5 $g/in^3$, about 2.0 $g/in^3$, about 2.5 $g/in^3$, about 3.0 $g/in^3$, about 3.5 $g/in^3$ or about 4.0 $g/in^3$, based on the substrate.

Method of Making the Catalyst Compositions

The method of making the compositions disclosed herein depends on the specific components incorporated within the compositions.

Preparation of base metal oxide component-impregnated support materials, PGM component-impregnated support materials, or rare earth metal oxide component-impregnated support materials generally comprise impregnating the support material in particulate form with an active metal precursor solution (e.g., a palladium component precursor, a copper-containing precursor, or a cerium-containing precursor). The active metal precursor is generally a salt of the active metal and is typically dissolved in a solvent to form an active metal precursor solution.

Where metal-impregnated support materials are included (e.g., PGM-impregnated supports), such impregnated materials are generally provided by impregnating the support material in particulate form with an active metal solution, such as a platinum, palladium and/or ruthenium precursor solution. The active metal can be impregnated into the same support particles or separate support particles using an incipient wetness technique. Incipient wetness impregnation techniques, also called capillary impregnation or dry impregnation are commonly used for the synthesis of heterogeneous materials, e.g., catalysts. Typically, a metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The concentration profile of the impregnated material depends on the mass transfer conditions within the pores during impregnation and drying.

The support particles are typically dry enough to absorb substantially all of the solution to form a moist solid. Aqueous solutions of water soluble compounds or complexes of the active metal (e.g., PGM component) are typically utilized, such as ruthenium chloride, ruthenium nitrate (e.g., Ru(NO) and salts thereof), hexaammine ruthenium chloride, or combinations thereof. An aqueous solution of water soluble compounds having palladium as the active metal comprises metal precursors such as palladium nitrate, palladium tetraamine, palladium acetate, or combinations thereof. Following treatment of the support particles with the active metal solution, the particles are dried, such as by heat treating the particles at elevated temperature (e.g., 100-150° C.) for a period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of active metal impregnation.

Typically, PGM components are dispersed on supports, e.g., refractory metal oxides such as activated alumina, using a PGM salt or complex (or PGM precursor). For the purposes of the present invention, the term "platinum group metal precursor" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum-group metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

Copper- or iron-containing molecular sieves for inclusion in certain compositions disclosed herein are prepared in some embodiments via ion-exchange from, for example, a $Na^+$ containing molecular sieve ($Na^+$ form). The $Na^+$ form generally refers to the calcined form of the molecular sieve without any ion exchange. In this form, the molecular sieve generally contains a mixture of $Na^+$ and $H^+$ cations in the exchange sites. The fraction of sites occupied by $Na^+$ cations varies depending on the specific zeolite batch and recipe. Optionally, the alkali metal molecular sieves are $NH_4^+$-exchanged and the $NH_4^+$ form is employed for ion-exchange with copper or iron. Optionally, the $NH_4^+$-exchanged molecular sieve is calcined to the $H^+$-exchanged form, and this $H^+$-exchanged form may be employed for ion-exchange with copper or iron ions.

Copper or iron is ion-exchanged into molecular sieves with $H^+$ form, alkali metal form, or $NH_4^+$ form (which can be prepared by $NH_4^-$ ion exchange into an alkali metal molecular sieve by methods known in the art, e.g., as disclosed in Bleken, F. et al. Topics in Catalysis 2009, 52, 218-228, which is incorporated herein by reference). The ion-exchange process generally comprises contacting the molecular sieves in particulate form with a metal precursor solution. For instance a $Na^+$, $NH_4$ or $H^+$ form of a molecular sieve is mixed with an aqueous salt solution and agitated at an elevated temperature for a suitable time. For example, a copper or iron salt such as copper acetate, copper sulfate, iron chloride, iron acetate and the like, can be used, as disclosed in U.S. Pat. No. 9,242,238 to Mohanan et al., which is incorporated herein by reference. The slurry is filtered and the filter cake is washed and dried. Such metals are generally ion exchanged into alkali metal or $NH_4$ molecular sieves.

Where the molecular sieves are promoted with two or more metals (e.g., copper in combination with one or more other metals), multiple metal precursors (e.g., copper and iron precursors) can be ion-exchanged at the same time or separately. In certain embodiments, the second metal can be exchanged into a molecular sieve material that has first been promoted with the first metal (e.g., a second metal can be exchanged into a copper-promoted molecular sieve material). For example, barium can be incorporated into a molecular sieve (e.g., CuCHA) by addition of Ba acetate before, after or in a co-exchange process with Cu. For examples of the preparation of SCR catalyst compositions comprising metal-promoted molecular sieves see U.S. Pat. No. 9,480,976 to Rivas-Cardona et al.; U.S. Pat. No. 9,352,307 to Stiebels et al.; U.S. Pat. No. 9,321,009 to Wan et al.; U.S. Pat. No. 9,199,195 to Andersen et al.; U.S. Pat. No. 9,138,732 to Bull et al.; U.S. Pat. No. 9,011,807 to Mohanan et al.; U.S. Pat. No. 8,715,618 to Turkhan et al.; U.S. Pat. No. 8,293,182 to Boorse et al.; U.S. Pat. No. 8,119,088 to Boorse et al.; U.S. Pat. No. 8,101,146 to Fedeyko et al.; U.S. Pat. No. 7,220,692 to Marshall et al.; U.S. Pat. No. 4,961,917 to Byrne et al.; U.S. Pat. No. 4,010,238 to Shiraishi et al.; and U.S. Pat. No. 4,085,193 to Nakajima et al., which are incorporated herein by reference in their entireties.

Method of Making the Catalyst Articles

The above-noted layer compositions are typically prepared in the form of catalyst particles as noted above. These catalyst particles can be mixed with water to form a slurry for purposes of coating a substrate, such as a honeycomb-type substrate. A catalytic coating contains one or more carriers containing active catalytic species. A catalytic coating may typically be applied in the form of a washcoat containing carriers having catalytically active species thereon. A washcoat is formed by preparing a slurry containing a specified solids content (e.g., 10-60% by weight) of carriers in a liquid vehicle, which is then coated onto a substrate and dried and calcined to provide a coating layer. When multiple coating layers are applied, the substrate is dried and calcined after each layer is applied and/or after the number of desired multiple layers are applied.

In addition to the catalyst particles, the slurry may optionally contain a binder in the form of alumina, silica, Zr acetate, colloidal zirconia, or Zr hydroxide, associative thickeners, and/or surfactants (including anionic, cationic, non-ionic or amphoteric surfactants). Other exemplary binders include bohemite, gamma-alumina, or delta/theta alumina, as well as silica sol. When present, the binder is typically used in an amount of about 1-5 wt. % of the total washcoat loading. Addition of acidic or basic species to the slurry can be carried out to adjust the pH accordingly. For example, in some embodiments, the pH of the slurry is adjusted by the addition of ammonium hydroxide or aqueous nitric acid. A typical pH range for the slurry is about 3 to 6.

The slurry can be milled to reduce the particle size and enhance particle mixing. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 10 to about 40 microns, preferably 10 to about 30 microns, more preferably about 10 to about 15 microns. The D90 is determined using a dedicated particle size analyzer. The equipment was manufactured by Sympatec in 2010 and uses laser diffraction to measure particle sizes in small volume slurry. The D90, typically with units of microns, means 90% of the particles by number have a diameter less than a quoted value.

The slurry is coated on the substrate using any washcoat technique known in the art. In one embodiment, the substrate is dipped one or more times in the slurry or otherwise coated with the slurry. Thereafter, the coated substrate is dried at an elevated temperature (e.g., 100-150° C.) for a period of time (e.g., 10 min to about 3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

With respect specifically to the LNT composition, for the bottom layer, finely divided particles of a high surface area refractory metal oxide such as gamma alumina and other catalyst components are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide, e.g., about 1.5 to about 6.0 $g/in^3$. Components such as the platinum group metals, transition metal oxides, stabilizers, promoters and the NOx sorbent component may be incorporated in the slurry as a mixture of water soluble or water-dispersible compounds or complexes. Thereafter the coated substrate is calcined by heating, e.g., at 400 to 600° C. for 1 to 3 hours.

The bottom layer of a layered (multi-layer) catalyst composite may be prepared by mixing a solution of a platinum group metal precursor and at least one finely divided, high surface area, refractory metal oxide support, e.g., gamma alumina, which is sufficiently dry to absorb substantially all of the solution to form a slurry. Preferably, the slurry is acidic, having a pH of about 3 to less than 7. The pH of the slurry may be lowered by the addition of a minor amount of an inorganic or organic acid such as hydrochloric or nitric acid, preferably acetic acid, to the slurry. Thereafter, the NOx sorbent component, and optional transition metal components, stabilizers and/or promoters may be added to the slurry. The slurry may thereafter be comminuted to result in substantially all of the solids having particle sizes of less than 20 microns, i.e., 1-15 microns, in an average diameter. The comminution may be conducted in a ball mill or other similar equipment, and the solids content of the slurry may be, e.g., 20-60 wt. %, preferably 25-45 wt. %.

The top layer is thereafter prepared and deposited on the bottom layer of the calcined substrate in a manner similar to that described above. After all coating operations have been completed, the substrate is again calcined by heating, e.g., at 400 to 600° C. for about 1 to about 3 hours.

Molecular sieves may be provided in the form of a powder or a spray-dried material is admixed with or coated with suitable modifiers. Modifiers include silica, alumina, titania, zirconia and refractory metal oxide binders (for example, a $ZrO_2$ binder derived from a suitable precursor such as zirconyl acetate or any other suitable zirconium precursor such as zirconyl nitrate). Zirconyl acetate binder provides a catalytic coating that remains homogeneous and intact after thermal aging, for example, when the catalyst is exposed to high temperatures of at least about 600° C., for example, about 800° C. and higher, and high water vapor environments of about 10% or more. Other potentially suitable binders include, but are not limited to, alumina and silica. Alumina binders include aluminum oxides, aluminum hydroxides, and aluminum oxyhydroxides. Aluminum salts and colloidal forms of alumina many also be used. Silica binders include various forms of $SiO_2$, including colloidal silica. Binder compositions may include any combination of zirconia, alumina, and silica. The powder or the sprayed material, optionally after admixing or coating by suitable modifiers, may be formed into a slurry, for example with water, which is deposited upon the substrate as disclosed for example in U.S. Pat. No. 8,404,203 to Bull et al., which is incorporated herein by reference.

Emission Treatment Systems

The present invention also provides an emission treatment system that incorporates the catalytic article described herein. The catalytic article of the invention is typically used in an integrated emissions treatment system comprising one or more additional components for the treatment of exhaust gas emissions. The disclosed emission treatment system typically further comprises a diesel oxidation catalyst (DOC) and/or a soot filter and/or, optionally, an ammonia oxidation catalyst. A soot filter may be uncatalyzed or may be catalyzed (CSF). For instance, a present treatment system may comprise, from upstream to downstream—an article containing a DOC, a CSF, an urea injector, a zoned SCR/LNT article as described herein above or a first SCR catalyst article and a second LNT article and an article containing an AMOx catalyst. Present systems may be close-coupled or under-floor.

The embodiments that include a first selective catalytic reduction (SCR) article and a second lean NOx trap (LNT) article may be referred to as a "multi-brick" system. A "brick" may refer to a single article such as a filter. The system, including the individual catalytic articles (in particular, the SCR catalyst composition disclosed herein), is effective to catalyze the reduction of nitrogen oxides (NOx) in the presence of a reductant, for example ammonia or urea. In operation, the reductant is periodically metered into the exhaust stream from a position upstream of the SCR catalyst composition/article. The injector is in fluid communication with and upstream of the SCR catalyst composition/article. The injector will also be associated with a reductant reservoir and a pump.

Advantageously, the catalyst article disclosed herein having a zoned SCR/LNT coating is a close-coupled catalytic converter located near the engine's exhaust outlet or exhaust manifold, for example, within about 12 inches of the exhaust outlet or exhaust manifold outlet. Alternatively, the present article may be an under-floor article. Alternatively, the SCR article may be close-coupled and the LNT article may be under-floor.

Figure 6:
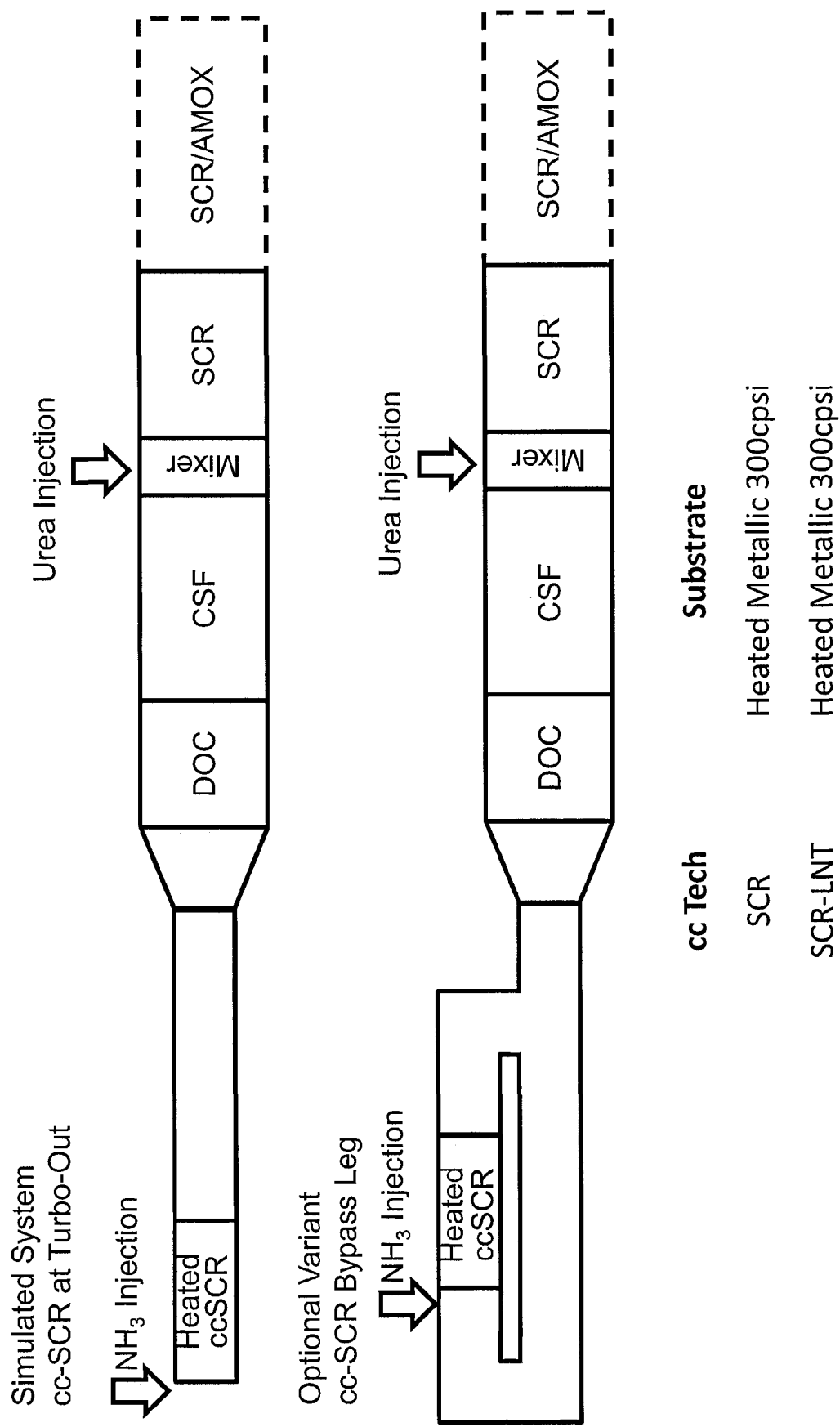
FIG. 6 is a schematic drawing of two exemplary systems, both with a ccSCR component with a DOC-CSF-SCR, and optional SCR/AMOx.
Figure 7:
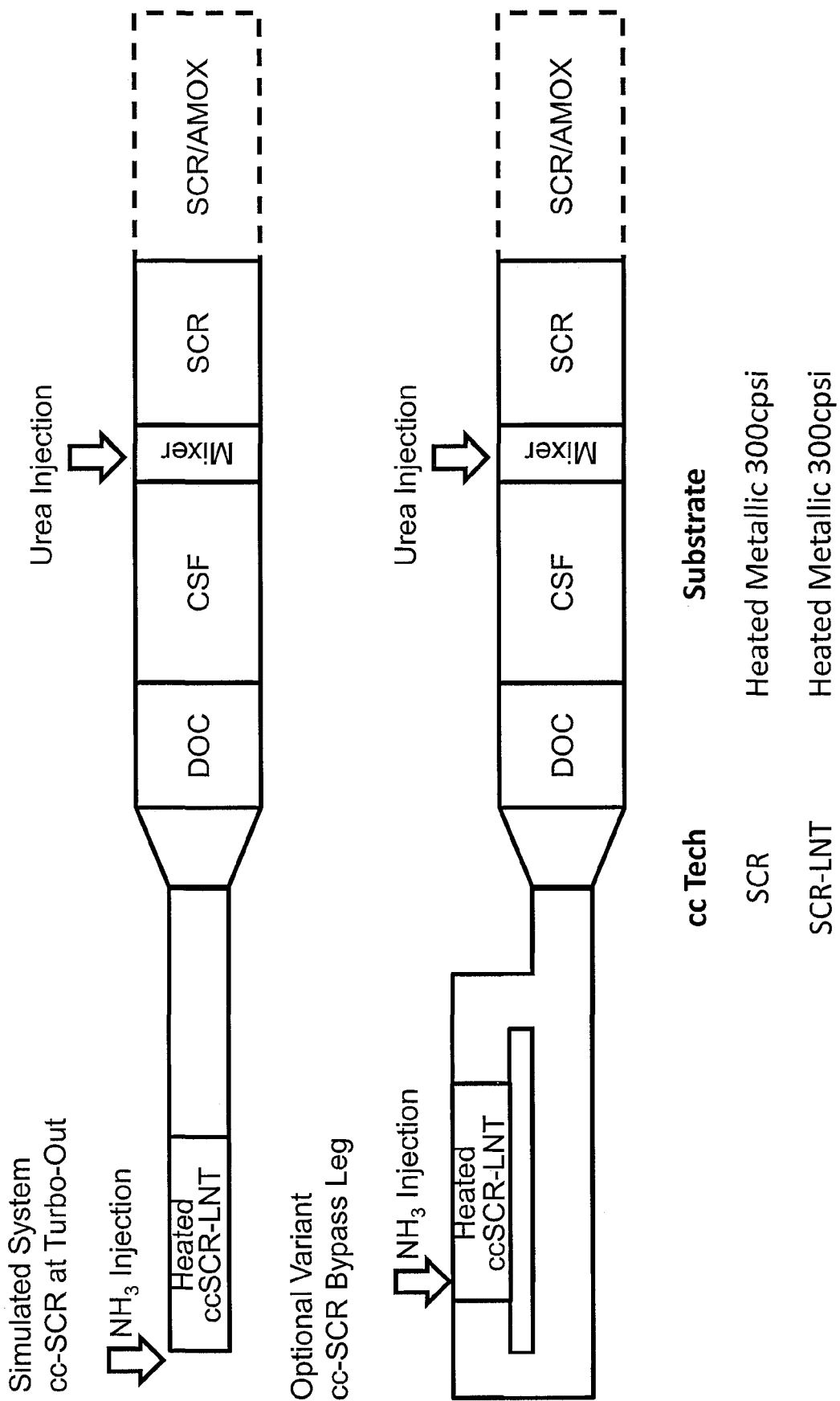
FIG. 7 is a schematic drawing of two exemplary systems, both with a ccSCR-LNT component with a DOC-CSF-SCR, and optional SCR/AMOx.

Further, the present article with a zoned catalytic coating is advantageously an electrically heated catalyst (EHC). An "electrically heated substrate" or "electrically heated catalyst" means that one or more heating coils or elements are associated therewith. Electrically heated catalysts are disclosed for example in U.S. Pat. No. 5,529,759 to Sanada et al., U.S. Pat. No. 5,553,451 to Harada, U.S. Pat. No. 5,480,621 to Breuer et al., and U.S. Pat. No. 6,044,644 to Hu et al.; and U.S. Pub. No. 2012/0076699 to Ishihara, which are all incorporated herein by reference. An electrically heated catalyst for instance contains a heating coil or heating element inside a catalytic converter assembly. The heating coils or elements are activated with electrical energy. For instance, the heating coils or elements are electrified just after the engine is started, bringing the catalyst up to operating temperature. Certain exemplary system configurations are illustrated in FIGS. 6 and 7.

Certain embodiments pertain to the use of articles, systems and methods for removing NOx from exhaust gas streams of internal combustion engines, in particular diesel engines, which operate at combustion conditions with air in excess of that required for stoichiometric combustion, i.e. lean conditions. Under lean burn conditions, the LNT layers can simultaneously store nitrogen oxides (NOx) and catalyze the conversion of hydrocarbons and carbon monoxide in exhaust gas streams. Under adequate rich regeneration conditions, stored NOx may be converted by the catalysts contained in both the top and bottom layers. "Lean gaseous streams," including lean exhaust streams, means gas streams that have a λ>1.0"Lean periods" refers to periods of exhaust treatment where the exhaust gas composition is lean, i.e., has a λ>1.0. "Rich gaseous streams," including rich exhaust streams, means gas streams that have a λ<1.0. "Rich periods" refers to periods of exhaust treatment where the exhaust gas composition is rich, i.e., has a λ<1.0.

In the present exhaust gas treatment methods, the exhaust gas stream is passed through the SCR/LNT catalyst article, SCR and LNT articles, or exhaust gas treatment system by entering the upstream end and exiting the downstream end. Present methods include, in particular, treating exhaust gas during a cold phase or cold start phase, that is where the exhaust gas temperatures are less than or equal to about 190° C., for instance from about 0° C. or about 20° C. to about 190° C. It is an object of the invention to provide catalytic articles and methods for treating exhaust gas streams containing nitrogen oxides at low temperature (during a cold start phase).

Present articles, systems and methods are suitable for treatment of exhaust gas streams from mobile emissions sources such as trucks and automobiles. Articles, systems and methods are also suitable for treatment of exhaust streams from stationary sources such as power plants. Present catalytic articles are also suitable for the catalysis of methanol-to-olefin (MTO) reactions, ethylene-to-propylene (ETP) reactions and co-reactions of methanol and ethylene (CME). Ammonia is a typical reductant for SCR reactions for treating exhaust of stationary power plants while urea is the typical SCR reducing agent for treatment of exhaust of mobile emissions sources.

EXPERIMENTAL SECTION

Example 1 (Modeling Simulations)

Figure 5:
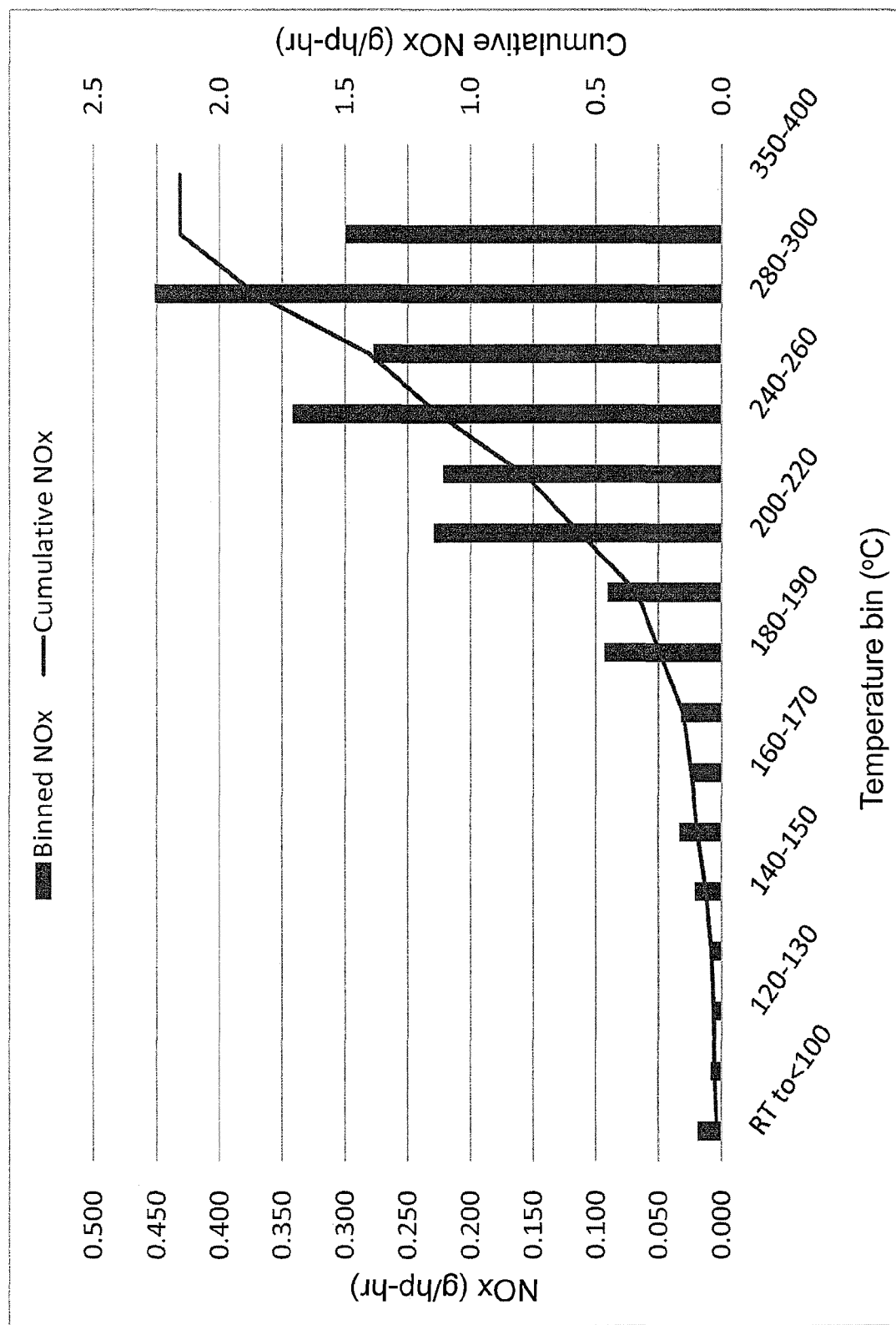
FIG. 5 is a graph demonstrating cold FTP NOx release distribution as a function of temperature.

As shown in FIG. 5, a bulk of NOx is generally released above 200° C. However, room temperature to 200° C. conversions are quite critical for emissions compliance. Traditional catalyst system architectures have limited activity in this temperature region, and the goal of this work is to provide a catalyst article/system with greater than 92% deNOx below 190° C.

Various system architectures were evaluated, which are depicted in FIGS. 6 and 7. Architecture 1 (FIG. 6) provides a close-coupled SCR (cc-SCR) with $NH_3$ injection. As shown, the cc-SCR is present at Turbo-out or in a bypass leg. Architecture 2 (FIG. 7) provides a close-coupled SCR-LNT (cc-SCR-LNT) with $NH_3$ injection. As shown, again, the cc-SCR-LNT is present at Turbo-out or in a bypass leg.

Certain assumptions were made for all cold-start simulations. Electrical heating was only active for the first 200 seconds of cold start FTP, with two options for the electrically heated substrate (10 kW or 20 kW max). The heating target was 250° C. out temperature. $NH_3$ dosing on close-coupled configurations was only active for the first 200 seconds of cold start FTP. It was further assumed that engine controls will be used to reduce 50% of NOx between room temperature and 100° C.

Figure 8:
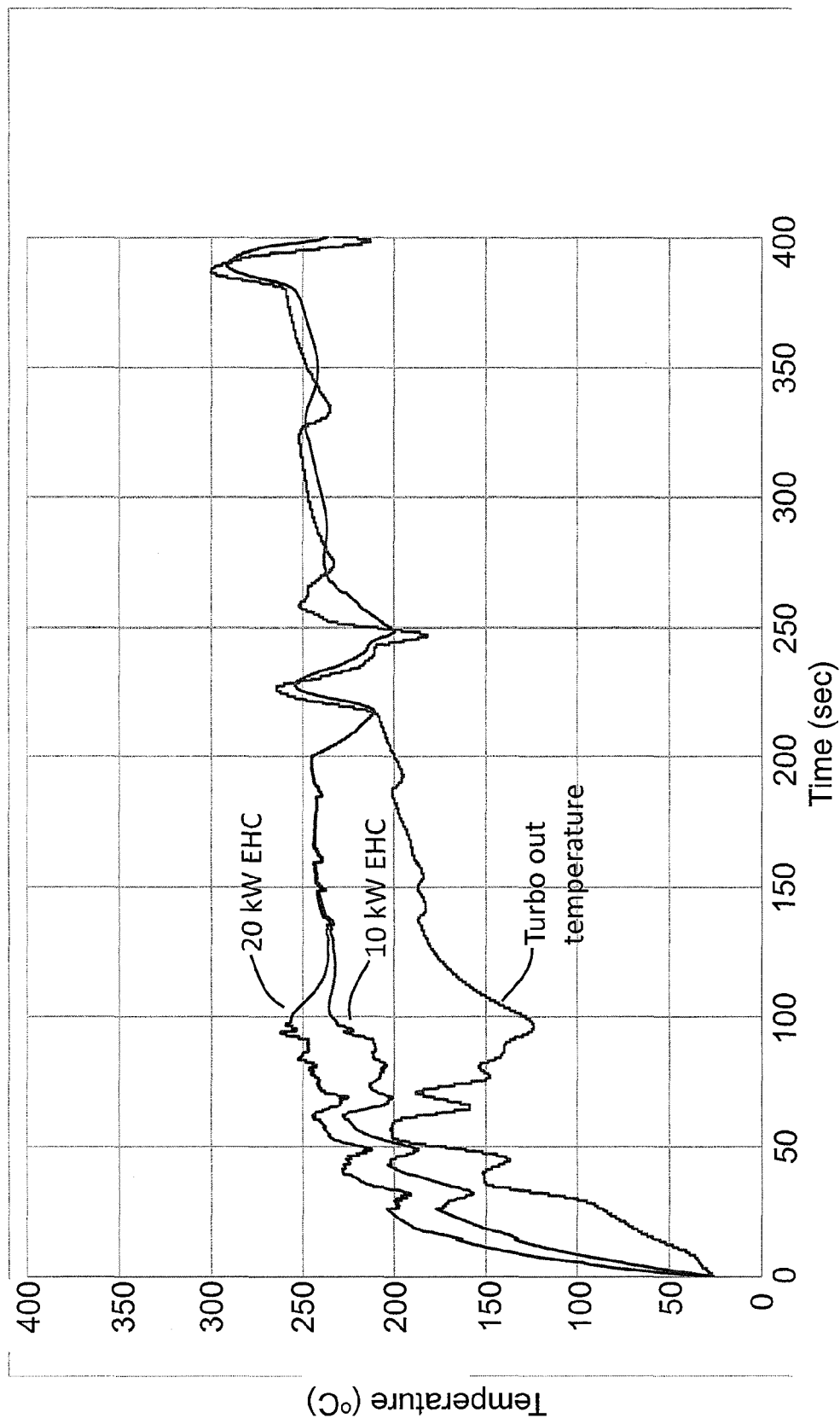
FIG. 8 is a graph of temperature v. time to demonstrate the effect of 10 kW and 20 kW electrical heaters on the gas temperature after the heater relative to the turbo out temperature.

The impact of an electrical heater was analyzed, as shown in FIG. 8, which provides a graph of temperature over time for a 10 kW EHC and 20 kW EHC, compared to the turbo out temperature. EHC is powered from t=0 to t=200 seconds in each of these simulations, and beyond t=200 seconds, the EO temperature is greater than 200° C.

The TP target of the simulations was 0.2 g/hp-hr combined FTP, i.e., 1/7×cold FTP+6/7×hot FTP less than or equal to 0.02. Based on these values, it was determined that the cold FTP must be less than or equal to 0.14 g/hp-hr.

Figure 9:
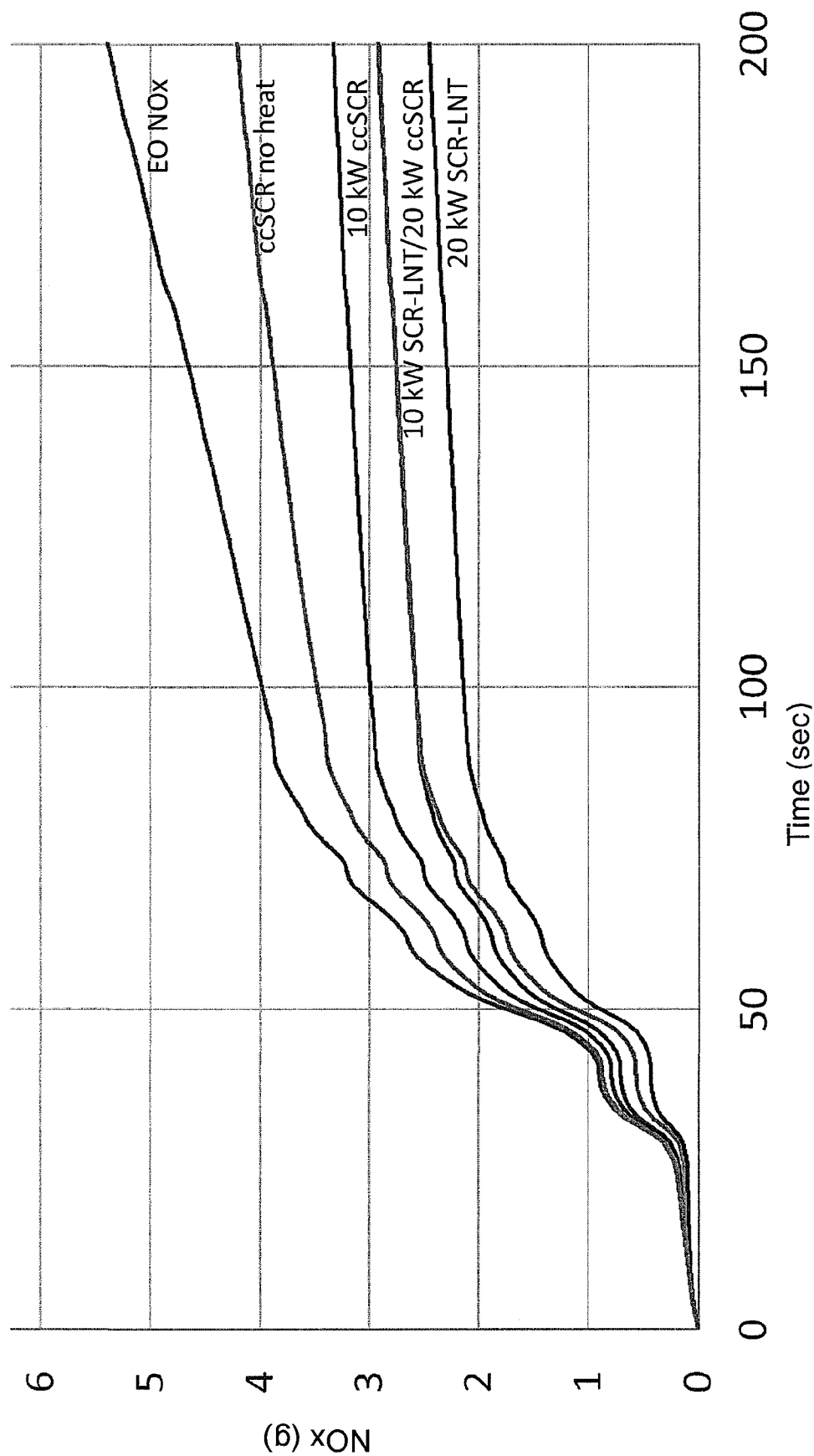
FIG. 9 is a graph of modeling data comparing various close-coupled catalyst compositions (SCR and SCR/LNT-based) with and without electrical heating.

Various close-coupled configurations were modeled to evaluate NOx control, as shown in FIG. 9. A 40% initial $NH_3$ loading on the ccCR was assumed, and it was further assumed that engine controls will be used to reduce 50% of NOx between room temperature and 100° C. The graph of FIG. 9 demonstrates that heated cc technologies provide significant reduction in NOx early in the cycle. Further, the graph demonstrates that LNT-based technologies are more active for NOx control in the first 50 seconds of the cycle.

Next, full system simulations were conducted, with close-coupled ("cc") out emissions used as feedgas for the under-floor ("UF") systems (cc system followed by UF, with no bypass). All UF systems consisted of DOC–CSF–SCR catalysts similar to commercially available systems for heavy-duty diesel engines. AMOx catalysts were not included in these simulations.

Figure 10:
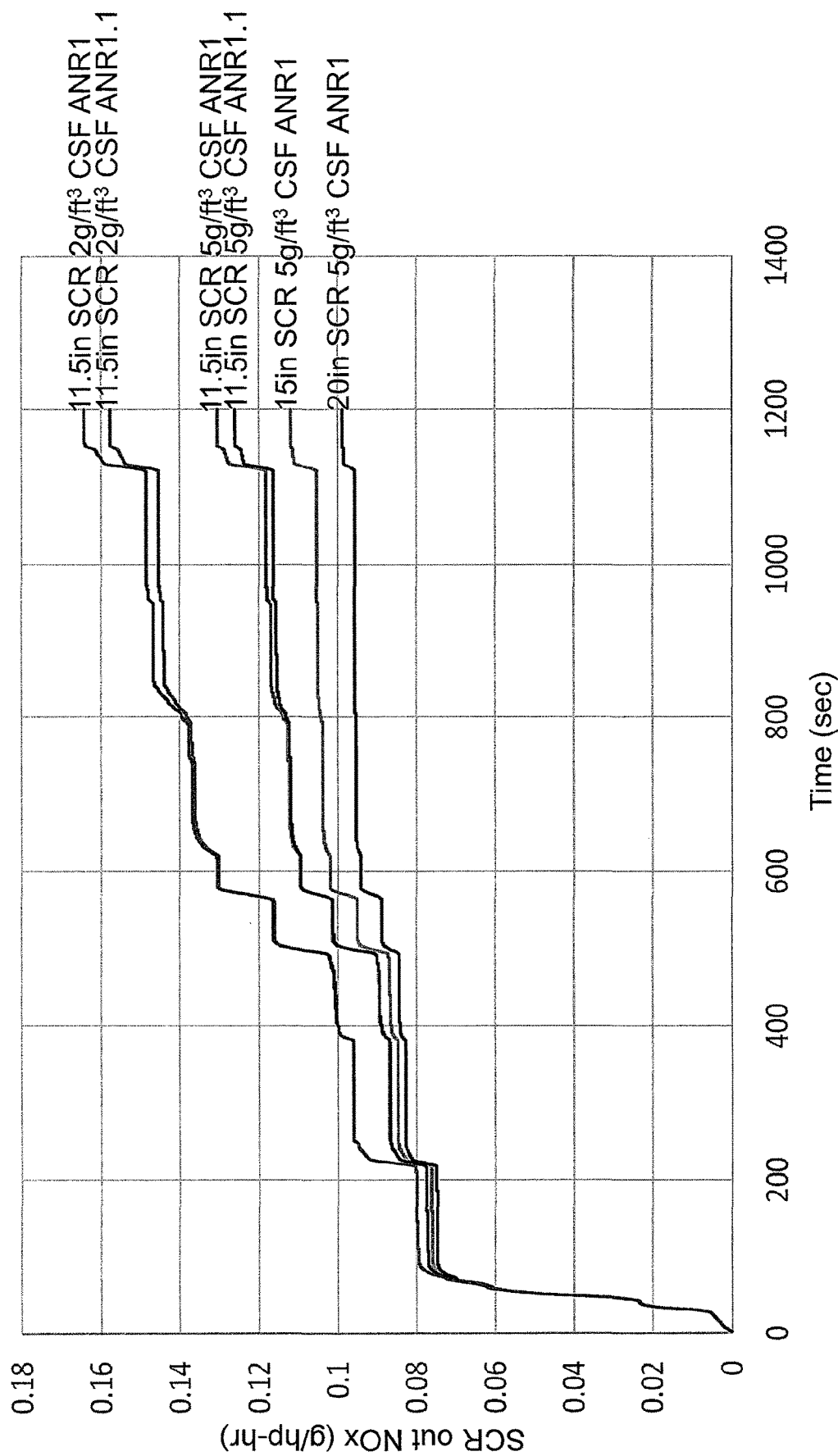
FIG. 10 is a graph of SCR-out NOx release based on modeling data for a system comprising a 10 kW electrical heater with ccSCR and UF DOC-CSF-SCR.
Figure 11:
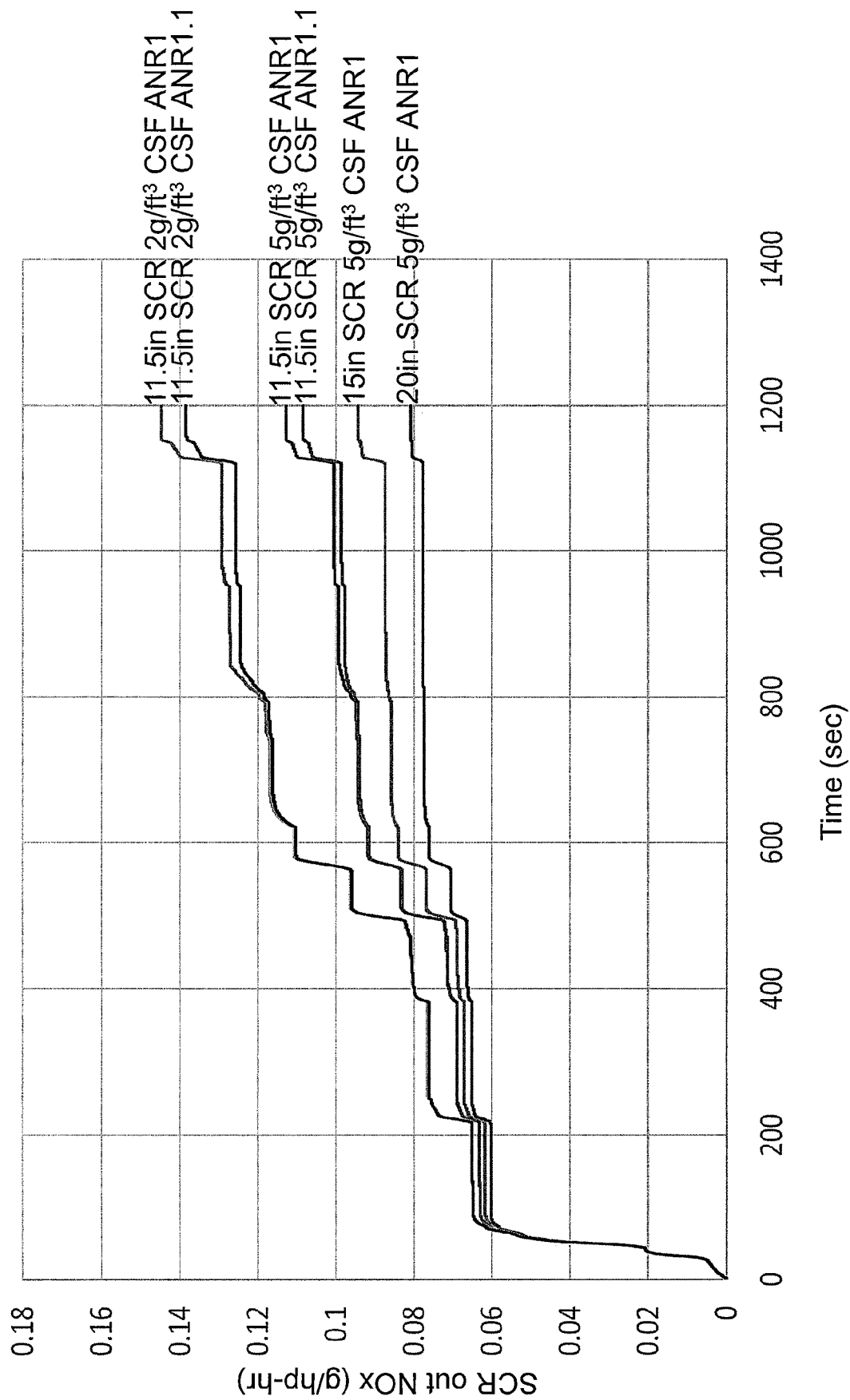
FIG. 11 is a graph of SCR-out NOx release based on modeling data for a system comprising a 20 kW electrical heater with ccSCR and UF DOC-CSF-SCR.

Modeling was conducted based on these systems with both a 10 kW EHC ccSCR and a 20 kW EHC ccSCR. As shown in FIG. 10, with a 10 kW EHC ccSCR with UF DOC–CSF–SCR, a 2 g/ft$^3$ CSF did not meet the noted emission requirement, whereas a 5 g/ft$^3$ CSF did meet the requirement. Increasing UF SCR volume was found to continue to improve deNOx performance. An ANR of 1.1 was found to improve performance over an ANR of 1. As shown in FIG. 11, with a 20 kW EHC ccSCR with UF DOC–CSF–SCR, a 2 g/ft$^3$ CSF can marginally achieve NOx below 0.14 g/hp-hr. Increasing UF SCR volume in such systems improved deNOx performance, and an ANR of 1.1 was found to improve performance over an ANR of 1.

Figure 12:
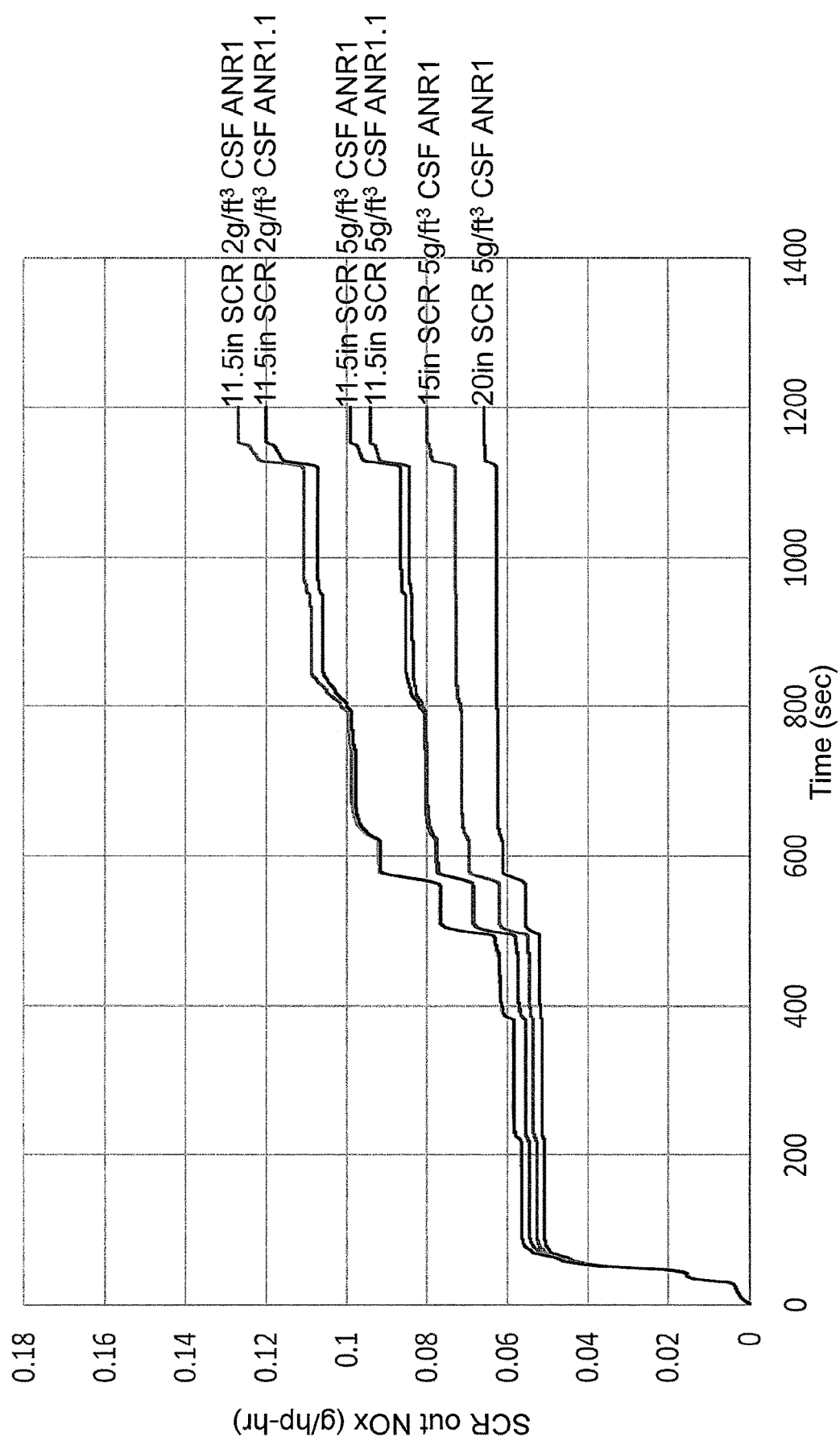
FIG. 12 is a graph of SCR-out NOx release based on modeling data for a system comprising a 10 kW electrical heater with ccSCR-LNT and UF DOC–CSF–SCR.
Figure 13:
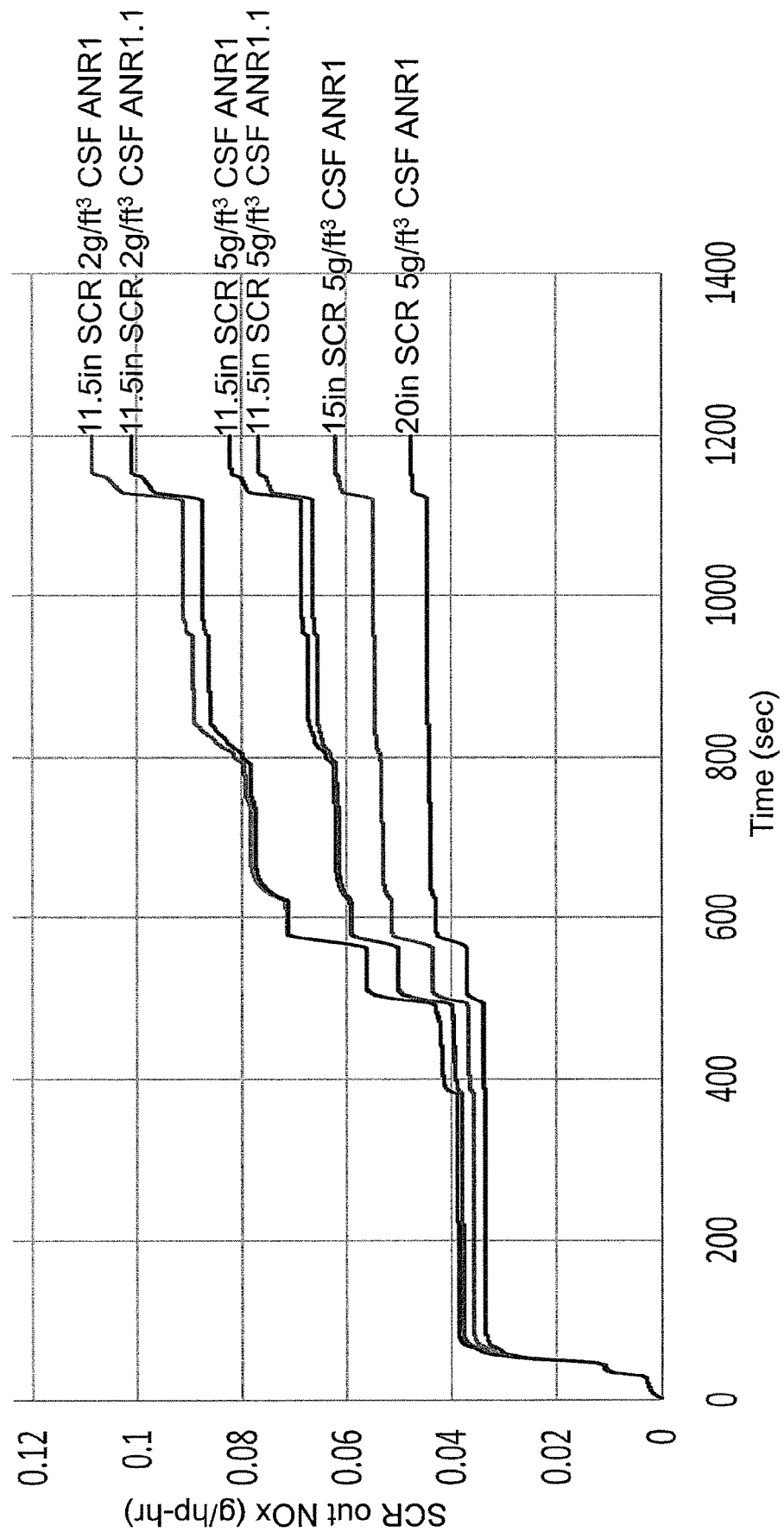
FIG. 13 is a graph of SCR-out NOx release based on modeling data for a system comprising a 20 kW electrical heater with ccSCR-LNT and UF DOC–CSF–SCR.

Modeling was also conducted based on systems with both a 10 kW EHC ccSCR-LNT and a 20 kW EHC ccSCR-LNT. As shown in FIG. 12, with a 10 kW EHC ccSCR-LNT with UF DOC–CSF–SCR, both 2 g/ft$^3$ and 4 g/ft$^3$ CSFs met the noted emission requirement. Increasing UF SCR volume was found to continue to improve deNOx performance. An ANR of 1.1 was found to improve performance over an ANR of 1. As shown in FIG. 13, with a 20 kW EHC ccSCR-LNT with UF DOC–CSF–SCR, again, both 2 g/ft$^3$ and 4 g/ft$^3$ CSFs met the noted emission requirement. Increasing UF SCR volume in such systems improved deNOx performance, and an ANR of 1.1 was found to improve performance over an ANR of 1.

Example 2 (Preparation)

Catalytic coatings containing SCR catalyst compositions are disposed via a washcoat process on cellular metallic substrates. The coated substrates are dried at temperatures below about 150° C. and calcined at temperatures above about 300° C. Likewise, catalytic coatings containing LNT compositions are also disposed via the washcoat process on the substrates followed by drying and calcination.

Coatings containing the SCR compositions are applied to the upstream zone and extend from the inlet towards the outlet. Coatings containing the LNT compositions are applied to the downstream zone and extend from the outlet towards the inlet. Coated substrates are prepared where the SCR coating length to the LNT coating length ratio is 10/90, 20/80, 30/70, 40/60, 50/50, 60/40, 70/30, 80/20, 90/10, 20/100 and 30/100. In the last two examples, the LNT coating extends the entire length of the substrate and the SCR coating overlays the LNT coating. The substrates may be coated with the SCR catalyst first and the LNT catalyst second or visa-versa.

The SCR compositions are applied at levels of from 0.5 g/in³ to 3.0 g/in³. The LNT compositions contain a NOx sorbent applied from 1 g/in³ to 5 g/in³, a PGM component applied from 50 g/ft³ to 150 g/ft³ and a support applied from 2 g/in³ to 4 g/in³.

SCR compositions tested are CuCHA, CuSAPO and Fe-beta. LNT compositions are layered and include an undercoat containing activated alumina containing ceria and BaO, ceria in particulate form, Pt and Pd. The LNT contains a topcoat containing activated alumina bearing Pt and Pd and ceria bearing Rh.

Comparative samples contain substrates coated along the entire length with only SCR compositions ("SCR only"). Inventive and comparative samples are assembled into a system including an upstream ammonia injector. The metallic substrates of the comparative samples are electrically heated with a heating element providing 20 kW of heat. The metallic substrates of the inventive samples are electrically heated with a heating element providing 10 kW of heat.

Testing is performed on an engine or chassis dynamometer with the system (ammonia injector and coated substrate) placed closely coupled to the engine. Downstream of the system, a traditional DOC+CSF+SCR+AMOX system is also present. Ammonia is injected based on either mapped engine NOx emissions or those measured by a sensor. The engine is operated through a cold-start cycle where in the catalyst temperatures are below 190° C. at the start and during a significant duration of the cycle. Electrical heating is applied to the substrate at the start of the test with a target of achieving 200° C. substrate temperature. At the point when the close-coupled system reaches 100° C., $NH_3$ injection commences at a ratio relative to the engine out NOx such that sufficient $NH_3$ is present to react with the NOx. Measurements of NOx reduction over the close-coupled system are made via emissions measurement techniques. The SCR/LNT system will show higher NOx control than the SCR only system with the additional advantage coming from capture of NOx on the LNT.

What is claimed is:

1. An exhaust gas treatment system comprising:
   a SCR catalyst composition; and
   a LNT composition;
      wherein the LNT composition is in fluid communication with the SCR catalyst composition and at least a portion of the LNT composition is downstream of at least a portion of the SCR catalyst composition;
      wherein the entire SCR composition is in direct contact with a first substrate;
      wherein the SCR catalyst composition is close-coupled; and
      wherein the LNT composition comprises a NOx sorbent and a platinum group metal component dispersed on a refractory metal oxide; and
   further comprising a downstream underfloor diesel oxidation catalyst, catalyst soot filter, and second SCR catalyst and
   a 2-20 kW electrical heater that electrically heats the SCR catalyst composition and LNT composition.

2. The exhaust gas treatment system of claim 1, wherein the LNT composition is disposed on a second substrate.

3. The exhaust gas treatment system of claim 1, wherein the LNT composition is disposed on the first substrate.

4. The exhaust gas treatment system of claim 3, wherein the SCR catalyst composition extends an entire length of the first substrate and the LNT composition overlays a portion of the SCR catalyst composition.

5. The exhaust gas treatment system of claim 3, wherein the LNT composition overlays the SCR catalyst composition.

6. The exhaust gas treatment system of claim 3, wherein the SCR catalyst composition and the LNT composition do not overlay each other.

7. The exhaust gas treatment system of claim 1, further comprising an ammonia oxidation catalyst.

8. The exhaust gas treatment system of claim 1, further comprising a reductant injector in fluid communication with and upstream of the SCR catalyst composition.

9. The exhaust gas treatment system of claim 2, where the first substrate is close-coupled and the second substrate is under-floor.

10. The exhaust gas treatment system of claim 1, wherein the SCR catalyst composition comprises base metal-containing 8-ring small pore molecular sieves.

11. A method for treating an exhaust stream containing NOx, comprising passing the exhaust stream through the exhaust gas treatment system of claim 1.

12. The method of claim 11, wherein the exhaust stream is ≤190° C.

13. A catalytic article comprising a substrate having a first, upstream end and a second, downstream end defining an axial length and having a zoned catalytic coating thereon, the catalytic coating comprising:
   an upstream zone comprising a selective catalytic reduction (SCR) catalyst composition, wherein the SCR catalyst composition is close-coupled; and
   a downstream zone comprising a lean NOx trap (LNT) composition, wherein the LNT composition comprises a NOx sorbent and a platinum group metal component dispersed on a refractory metal oxide;
   and wherein the entire SCR composition is in direct contact with the substrate.

14. The catalytic article of claim 13, wherein the substrate is a porous wall-flow filter.

15. The catalytic article of claim 13, wherein the substrate is a flow-through monolith.

* * * * *